United States Patent
Conlon et al.

(10) Patent No.: US 10,097,464 B1
(45) Date of Patent: Oct. 9, 2018

(54) SAMPLING BASED ON LARGE FLOW DETECTION FOR NETWORK VISIBILITY MONITORING

(71) Applicant: Amazon Technologies, Inc., Seattle, WA (US)

(72) Inventors: Declan Sean Conlon, Sydney (AU); Raymond Scott Whiteside, Austin, TX (US); Thomas A. Volpe, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 154 days.

(21) Appl. No.: 14/983,165

(22) Filed: Dec. 29, 2015

(51) Int. Cl.
 *H04L 12/803* (2013.01)
 *H04L 12/26* (2006.01)

(52) U.S. Cl.
 CPC .......... *H04L 47/125* (2013.01); *H04L 43/022* (2013.01); *H04L 43/0882* (2013.01)

(58) Field of Classification Search
 CPC .. H04L 47/125; H04L 43/022; H04L 43/0882
 See application file for complete search history.

(56) References Cited

U.S. PATENT DOCUMENTS

| | | | | |
|---|---|---|---|---|
| 7,065,036 | B1 * | 6/2006 | Ryan | H04L 1/0052 370/208 |
| 7,817,652 | B1 * | 10/2010 | MacAdam | H04L 47/10 370/412 |
| 8,526,458 | B1 * | 9/2013 | Jensen | H04L 27/2631 370/432 |
| 9,466,288 | B2 * | 10/2016 | Zhang | G10L 15/02 |
| 2002/0051546 | A1 * | 5/2002 | Bizjak | H03G 3/3089 381/106 |
| 2003/0174655 | A1 * | 9/2003 | Luk | H04L 43/12 370/252 |
| 2005/0013300 | A1 | 1/2005 | Akahane | |
| 2007/0079036 | A1 * | 4/2007 | Mukherjee | G06F 1/3203 710/119 |

(Continued)

OTHER PUBLICATIONS

U.S. Appl. No. 14/983,159, filed Dec. 29, 2015, Titled: Network Visibility Monitoring.
U.S. Appl. No. 14/983,169, filed Dec. 29, 2015, Titled: Large Flow Detection for Network Visibility Monitoring.
U.S. Appl. No. 14/983,174, filed Dec. 29, 2015, Titled: Historically Large Flows in Network Visibility Monitoring.

(Continued)

*Primary Examiner* — Khaled Kassim
(74) *Attorney, Agent, or Firm* — Kilpatrick Townsend & Stockton LLP

(57) ABSTRACT

Provided are systems and methods for sampling packets based on large flow detection, for network visibility monitoring. In some implementations, provided is an integrated circuit. The integrated circuit may include large-flow detection logic and a sampling determination logic. The integrated circuit may be operable to received packet information describing a packet a cycle of a clock input. The packet may be associated with a packet flow being transmitted through a network. The integrated circuit may further be operable to determine, using the large-flow detection logic, whether the packet is associated with a large packet flow or a small packet flow. Upon determining that the packet is associated with a small packet flow, the integrated circuit may update the sampling determination logic.

22 Claims, 15 Drawing Sheets

(56) References Cited

U.S. PATENT DOCUMENTS

| | | | |
|---|---|---|---|
| 2007/0115850 A1* | 5/2007 | Tsuchiya | H04L 43/022 370/252 |
| 2008/0028467 A1* | 1/2008 | Kommareddy | H04L 63/1458 726/23 |
| 2009/0193105 A1 | 7/2009 | Charny | |
| 2011/0164503 A1* | 7/2011 | Yong | H04L 69/22 370/237 |
| 2012/0002675 A1* | 1/2012 | Kauschke | H04L 45/06 370/400 |
| 2013/0212296 A1* | 8/2013 | Goel | H04L 45/7453 709/238 |
| 2014/0029493 A1* | 1/2014 | Vos | H04L 67/2823 370/310 |
| 2014/0126393 A1 | 5/2014 | Kirshnan et al. | |
| 2015/0016255 A1* | 1/2015 | Bisht | H04L 47/11 370/235 |
| 2015/0071072 A1* | 3/2015 | Ratzin | H04L 47/11 370/235 |
| 2015/0124825 A1 | 5/2015 | Dharmapurikar et al. | |

OTHER PUBLICATIONS

Estan, Cristian and George Varghese, "New Directions in Traffic Measurement and Accounting: Focusing on the Elephants, Ignoring the Mice," ACM Transactions on Computer Systems, vol. 21, No. 3 (Aug. 2003), pp. 270-313.

Hohn, Nicolas and Darryl Veitch, "Inverting Sampled Traffic," IMC '03, Proceedings of the 3rd ACM SIGCOMM Conference on Internet Measurement (Oct. 27-29, 2003), pp. 222-233.

Li et al., "Probabilistic Fading Counting: An efficient identification method for finding heavy hitters," 2010 International Conference on Computer Application and System Modeling (ICCASM) (Oct. 22-24, 2010), pp. 493-497.

Manku, Gurmeet Singh and Rajeev Motwani, "Approximate Frequency Counts over Data Streams," Proceedings of the 28th VLDB Conference (2002), 12 pages.

Metwally et al., "Efficient Computation of Frequent and Top-k Elements in Data Streams," Lecture Notes in Computer Science, vol. 3363 (2005), pp. 398-412.

* cited by examiner

SAMPLING BASED ON LARGE FLOW DETECTION FOR NETWORK VISIBILITY MONITORING

BACKGROUND

A large amount of packet traffic crosses a network at any given moment. Network engineers desire an accurate measurement of network traffic, in order to determine how well the network is operating, and how the network should be provisioned. Network traffic can be viewed as a collection of packet flows. There are various methods for measuring packet flows, including packet sampling and flow caching. Packet sampling involves copying at least a part of a packet and analyzing the copied data. The copied data may include a large portion of the packet's header, and thus may provide information about where the packet came from, where it was going, and/or its size, among other things. Typically, only a selection—for example one out of 5000—packets are sampled. Flow caching involves storing information about packet flows, which can be derived from the packets seen at a network node. The information stored for the packet flows may include information identifying the packet flow, and/or statistics about the packet flow. The information for the packet flow can be analyzed to estimate information about the packet flows, such as how much bandwidth each flow used, how many packets were in the flow, and/or how long the flow lasted.

BRIEF DESCRIPTION OF THE DRAWINGS

Various embodiments in accordance with the present disclosure will be described with reference to the drawings, in which.

DETAILED DESCRIPTION

Figure 1:
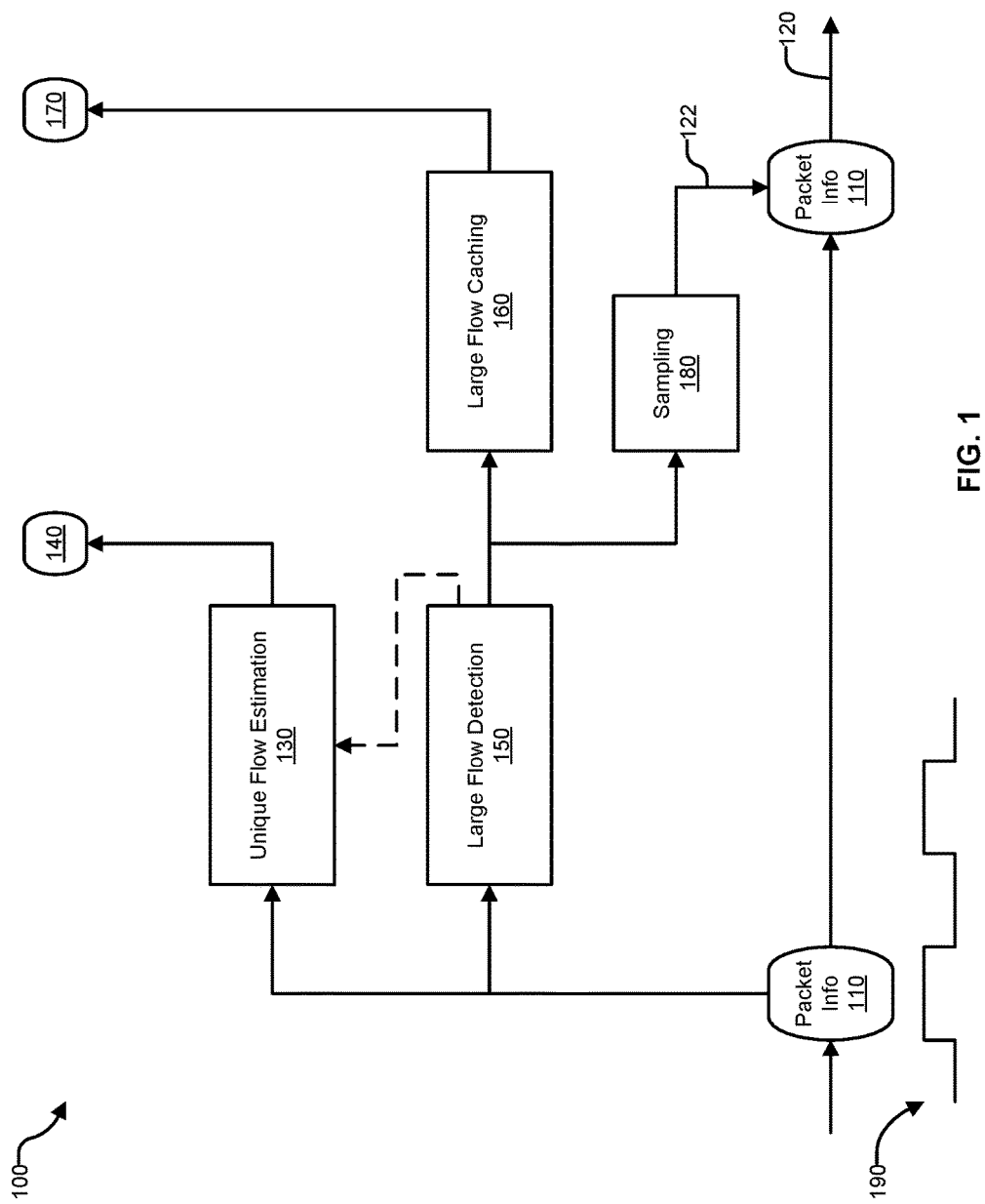
FIG. 1 illustrates an example of a method for network visibility monitoring, implemented in this example as an integrated circuit.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Traffic engineering is a method of optimizing the performance of a telecommunications network by dynamically analyzing, predicting, and regulating the behavior of data transmitted over that network. Traffic engineering is also known as teletraffic engineering and traffic management. Traffic engineering requires reasonably accurate measurement of network traffic, in order to determine how well the network is operating. Network engineers need to evaluate not only the overall health of a network, but also the state of packet traffic at each node in the network, to determine whether any nodes are suffering unreasonable congestion and/or whether each node is providing sufficient bandwidth, among other things. With accurate traffic measurements, network engineers may be better able to optimally provision a network.

In many implementations, network traffic measurement tools are placed in the switches, routers, and hubs that form the nodes of a network. Doing so may provide a fine-grained visibility into the operation of the network. A typical problem faced by network engineers occurs when a node in the network goes offline. Packet traffic typically crosses many nodes to reach their ultimate destination on a network. Failure of a node along that path means that the packets traffic that had been going through the now-disabled node typically needs to be rerouted through other parts of the network. Rerouting the traffic is best done intelligently, so that other parts of the network are not overburdened while lightly used parts of the network remain lightly used. Moving traffic intelligently, however, may be difficult if the network has little or no knowledge about the packet flows that were going through the disabled node.

Network traffic measurement data may also be helpful in detecting attacks on the network. For example, one type of attack is a denial-of-service attack. One type of denial-of-service attack typically involves flooding a network with packets, in an attempt to overwhelm and possibly take down some or all of the network. Another type of denial-of-service attack may involve a very large number of small and unrelated packets converging on and overwhelming one point in a network. Watchdog processes in the network may be able to detect a denial-of-service attack by detecting an unusually large packet flow. In some cases, it may also be possible to locate the source of the packet flow, and block the source from further access to the network.

In some cases, network traffic monitoring tools are also placed at a server's interface with a network. These tools provide network engineers with a visibility into the traffic flowing into and out of the servers.

Packets that comprise network traffic are typically grouped into flows of packets. A packet flow may be described as a stream of data from one source system on a network to one destination system on the network. A video being streamed over the network to a user's device is one example of a stream of data having a source (the server providing the video) and a destination (the user's device). The data for the video would typically be sent over the network in a series of packets, which may be called a packet flow, or more simply a flow. A flow may be identified by a combination of values associated with the packets in the flow, such as for example source and destination Internet Protocol (IP) addresses, source and destination port numbers, IP protocol type, and/or type of service, among others.

Network traffic can thus be viewed as a collection of packet flows. Traffic measurement may then be accomplished by measuring each flow. These measurements may provide visibility into, for example, the size of flows (e.g., how much bandwidth is each using), the sources and destinations of flows, the start and end of flows, and possibly also how many flows are traversing a node in the network.

The simplest way to measure packet flows may be to simply look at and count each packet seen at a network node, but for the sheer volume of traffic seen at any interface of a network node, this is impractical. An alternative method is called packet sampling. Packet sampling typically involves taking a sample from one out of so many packets seen at an interface of a network node. For example, the network node may be configured to take a sample from one out of every 5000 packets seen at a particular interface, where the sample is a copy of the first 128 bytes of the packet. The first 128 bytes of the packet may include some or all of the header section of the packet, which may provide useful information about the packet. The network node may further be configured to send the samples to its own processor for analysis. More often, however, the network node may be configured to send one or more samples in a packet to a collector device connected to the network. The collector device may be, for example, a server designated for collecting, analyzing, and logging packet samples. The collector device may be able to aggregate data from multiple network nodes, and provide a wide view of all or a part of a network. One commercial implementation of packet sampling is called sFlow. sFlow provides a standardized method, adopted by many vendors, for implementing packet sampling.

Packet sampling may reduce the burden that data collection places on network nodes. Packet sampling, however, may provide limited information about the flows that sampled packets belong to. In most cases, it may be possible to identify the flow that a packet belongs to, but a single packet, or even several packets, from a flow provides very little information about the flow itself. The sampling tools may make an educated guess, but it is difficult for the tools to make these guesses accurately. Furthermore, sampling one out of several thousand packets may provide not only limited information about flows, but also may cause many small flows to be missed entirely. Missing these small flows may make any estimation of the number of unique flows seen at a collection point very difficult. Analysis can be performed on the samples after they are collected, but due to the nature of the data collected, the flows may still be difficult to identify and quantify.

Another method for measuring network traffic is flow caching. Flow caching attempts to sample flows, instead of packets. Flow caching typically involves examining every packet that passes through an interface on a network node, and identifying the flow that the packet belongs to. A cache, or memory, may be used to store identification information for each flow, where the identification information may include information such as, for example, source and destination information and/or protocol or service information. Once a flow has been cached, additional packets for the flow are used to update statistics about the flow. For example, the stored flow data may include a counter that is incremented for every packet seen for a particular flow. Periodically, the cache may be read and the contents sent to the network node's processor for analysis. More typically, the cache contents may be sent in packets to a collector device in the network. NetFlow is one commercial implementation of flow caching.

Flow caching may thus provide somewhat accurate visibility into the flows at a network node, particularly when there are few flows. Flow caching's accuracy, however, begins to degrade when the number of flows increases. The number of flow identifiers that can be stored in the cache is limited to the size of the cache, and the size of the cache is limited to the amount of memory that can be fit into an integrated circuit device. Alternatively, more memory can be provided outside of the device, but this memory may be too slow for the rate at which packets pass through the device. When the cache is full and a packet for a new flow is seen, the identification information for that packet cannot be stored and the information for that flow may be lost. One solution to this problem may be to send out the contents of the cache more frequently. But space would still need to be freed in the cache, and it may be difficult to determine which cache lines to clear. Any cache line that is cleared may contain identification information for a flow that is still passing through the network node, so that clearing that cache line causes the information for that flow to be reset.

Packet sampling and flow caching each have good features, hence another method for traffic monitoring is packet sampled flow caching, which combines features from both. With sampled flow caching, instead of attempting to capture every flow, only a sampling of flows may be captured. This may be accomplished, for example, be examining only one out of so many packets (e.g., one out of every 5000) and storing the flow information for that packet. Packet sampled flow caching, however, may still suffer from some of the limitations of both packet sampling and flow caching. For example, many flows may be missed when only one out of several thousand packets is examined. Also, how to size the cache, how often to read the cache and send the data, and which cache lines to clear and when, continue to be issues.

Packet sampling and flow caching nevertheless provide very useful visibility into network traffic. These methods can be combined with methods that attempt to determine the size of flows to reduce the inaccuracy in the data collected using only one or the other.

Specifically, systems and methods are disclosed herein that make use of the understanding that, in a typical network, a small percentage of flows account for a large percentage of the traffic. In various implementations, the systems and methods disclosed herein attempt to identify large flows from small flows. In some implementations, packets may be identified as belonging to a large flow, and the flow's identification information (e.g., source and destination information) may be extracted from the packet. The identification information for the large flow may then be cached. By not caching the small flows, which may tend to be more numerous, a limited amount of memory may be used to store more useful information. In some implementations, only packets from flows identified as small flows may be sampled. By not sampling the large flows, which may tend to have many packets, the sampling rate can be increased and small flows may be measured more accurately. Packet sampling may still have a margin of error, since not every packet is sampled. Thus, in various implementations, the systems and methods disclosed herein may include unique flow estimation.

Unique flow estimation may provide an estimate of the number of unique flows, large and/or small, in the packet traffic through a network node. This information may be correlated against the large flow and small flow measurements to provide insight into accuracy of the measurement data.

Various implementations are disclosed for implementing traffic monitoring in the hardware of a network node. These various implementations may have a minimum impact on the normal flow of packets through the device, may make minimum use of the device's processor, and may be able to examine packets at the high rate in which packets pass through the device. In various implementations, the device's processor may be used mostly for configuration of the device, and only for very rare occasions to process packets.

A hardware implementation for caching primarily large flows, sampling primarily small flows, and estimating the number of unique flows seen may increase the accuracy of measurement data extracted from the network traffic flowing through a switch or router. More accurate data provides network engineers with better visibility into the operation of the network, and enables better provisioning and management of the network.

I. Network Visibility Monitoring

FIG. 1 illustrates an example of a method for network visibility monitoring, implemented in this example as an integrated circuit 100. The integrated circuit 100 of this example may include logic modules for unique flow estimation 130, large flow detection 150, large flow caching 160, and packet sampling 180. The circuit 100 may also include a clock signal 190, which may be driven by a clock circuit not illustrated here. The example circuit 100 may be included in the hardware of a network device, such as for example a switch or a router. The circuit 100 may be part of a larger circuit in the network device, such as for example circuit for switching and/or routing packets though the network device. The circuit 100 may be implemented in all or part as a system-on-a-chip (SOC), an application-specific integrated circuit (ASIC), or field-programmable gate array (FPGA), or in a combination of devices. In most implementations, the circuit 100 may be placed such that the circuit 100 may be exposed to most or all packets, or information describing most or all packets, that pass through the network device. In some implementations, the network device may include multiple instances of the circuit 100 to monitor different interfaces on the network device, and/or to divide the work of examining each packet passing through the network device.

The logic modules illustrated in FIG. 1 may provide different information about packet flows, which together may be used to reduce the inherent margin of error in traffic monitoring. The circuit 100 may receive packet information 110 at a cycle of the clock signal 190. Packet information describes a packet, and may include information such as the packet's size, the type and sizes of headers included in the packet, source and destination addresses and/or ports for the packet, the packet's class or type, a current drop status for the packet, and other information that maybe found in the header of a packet. Packet information may also be referred to as packet metadata, or simply metadata. Packet information for a packet typically occupies fewer bytes than the packet itself. Packet information may thus be used as a smaller and more easily handled proxy for the packet. In most cases, the packet itself is not received by the circuit 100. In some implementations, the circuit 100 may receive the actual packet data, and may parse the packet to extract any necessary fields from the packet's header.

The unique flow estimation 130 may examine the packet information 110 and provide an estimate of the number of unique flows seen by the circuit 100. The unique flow estimation 130 may collect data over a specified interval of time. During the data collection interval, the unique flow estimation 130 may receive packet information 110 for a number of packets. Using information provided by the packet information, the unique flow estimation 130 may attempt to count the number of unique flows represented by the packet information. In some implementations, the unique flow estimation 130 may include all flows, both large and small. In some implementations, the unique flow estimation 130 may include only large flows or only small flows. In these implementations, the unique flow estimation 130 may use information provided by the large flow detection 150 to identify packets associated with small flows. At the end of the data collection interval, the unique flow estimation 130 may export the collected data 140. The data 140 may be sent to a local processor and/or to a collector device connected to the network.

The large flow detection 150 may attempt to determine, using the packet information 110, whether the packet described by the packet information 110 is part of a large flow or a small flow. When a packet is identified as belonging to a large flow, the packet information 110 may be further processed by the large flow caching 160. When the packet is identified as belonging to a small flow, the packet information may be further processed by the sampling 180 logic.

The large flow caching 160 may, over a specified interval, collect data about flows identified by the large flow detection 150 as large flows. During the data collection interval, the large flow caching may extract information from the packet information 110 that can be used to identify the flow that the associated packet belongs to. The identification information may be cached in a memory in the large flow caching 160. The large flow caching 160 may further store statistics about each large flow that is cached. At the end of the data collection interval, the large flow caching 160 may export the cached data 170. The data 170 may be sent to a local processor and/or to a collector device connected to the network.

The sampling 180 logic may keep track of packets to be sampled. For example, the sampling 180 logic may include a sampling counter that may increment for every packet identified as belonging to a small flow. When the counter reaches a pre-determined limit, the packet that caused the pre-determined limit to be reached may be marked as to be sampled. In some implementations, the sampling 180 logic may set a value 122 in the packet information 110 that indicates that the packet associated with the packet information 110 is to be sampled. The packet information 110 may continue 120 to another circuit, which may be configured to take the sample from the packet. In some implementations, such as for example in implementations where the circuit 100 has access to the actual packet data, the sampling 180 logic may itself take the sample from the packet.

In various implementations, the circuit 100 is configured to receive packet information 110 for a packet at each cycle of the clock signal 190. A cycle of the clock signal is the time span from the rising (or falling) edge of the clock signal 190 to the next rising (or falling) edge of the clock signal 190. In these implementations, each of the unique flow estimation 130, large flow detection 150, large flow caching 160, and sampling 180 operate on the same packet information 110 during a given clock cycle.

Figure 2:
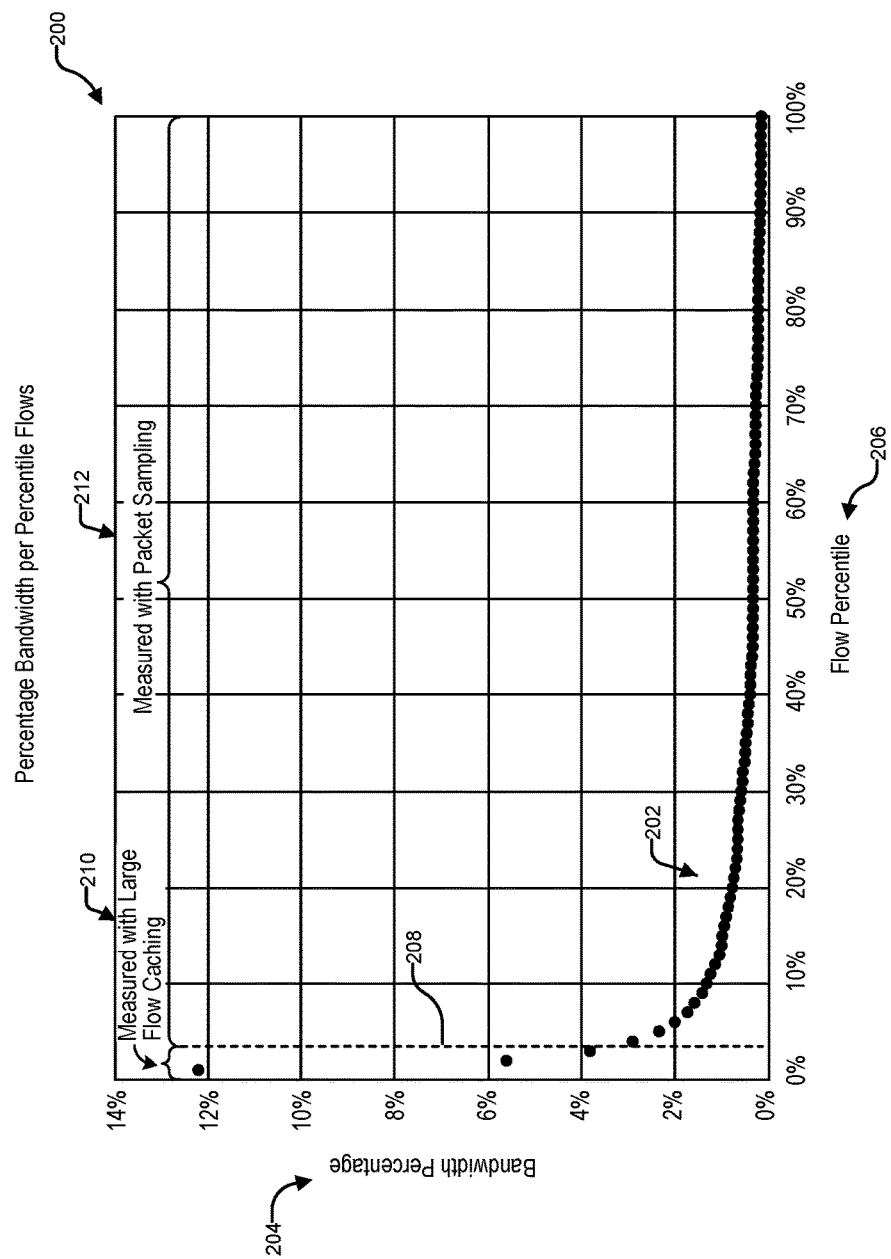
FIG. 2 provides a graph illustrating an example of the percentage of bandwidth per percentile of flows, and illustrates an example of what qualifies a flow as "large" or as "small;"

The method implemented by the circuit 100 of FIG. 1 takes advantage of the typical pattern of bandwidth usage observed for the packet traffic in a large network. FIG. 2 provides a graph 200 illustrating an example of the percentage of bandwidth per percentile of flows, and illustrates an example of what qualifies a flow as "large" or as "small." The horizontal axis 206 of the graph 200 indicates a percentile position for the flows in the example data set. The vertical axis 204 indicates the percentage of bandwidth, out of the total bandwidth for the example flows in the data set, used by each percentile of flows. Each dot 202 in the graph 200 then represents the percentage of bandwidth contributed by a certain percentile of flows. The example data illustrated in the graph 200 may represent a typical traffic pattern for a large network.

The graph 200 illustrates that for a typical traffic pattern, a small number of flows contribute a large amount of bandwidth, while the majority of the flows contribute only a small amount of the total bandwidth seen. For example, according to the graph 200, about one percentile of flows contributes 12.25% of the bandwidth, while flows between about the sixth percentile to the hundredth percentile each contribute less than 2% of the total bandwidth used.

The flows that use a large amount of bandwidth—ones falling within the steep part of the curve illustrated in the graph 200—may be called "large" flows, while the flows that use little bandwidth and fall in the flat part of the curve, may be called "small" flows. What qualifies a flow as large or small be depend on the traffic crossing a particular network at a particular time. For example, a flow consisting of many minimum size packets may together only be 1000 bytes long, and thus be considered a small flow, while a flow of a single packet that is 9000 bytes in size may be considered a large flow.

Similarly, the differentiating line 208 between large flows and small flows may change as the traffic through a the observation point changes. As will be discussed below, the example circuit 100 of FIG. 1 may be configured to accommodate these changes, and may allow the differentiating line 208 illustrated in FIG. 2 to drift towards the flat portion of the curve, or back towards the steep portion.

As illustrated in FIG. 2, there are very few large flows compared to small flows in a typical traffic pattern. Because large flows are few, large flows can be measured with flow caching. With relatively few flows to cache, a circuit for flow caching can be implemented with cache memories of a reasonable size. Small flows, on the other hand, may be sampled. For small flows, retrieving the flow information may be less important, while obtaining a sample of as many packets as possible may be more useful.

II. Large Flow Detection and Sampling Based on Large Flow Detection

Various methods exist for detecting large packet flows in a packet traffic passing through a node in a network. While each of these methods provide useful data, they may not each be easy to implement, particularly in a hardware implementation designed to examine packets at the speed at which the packets pass through a network node.

One method for identifying large flows is known as Lossy Counting. In a Lossy Counting process, a counting table is maintained. Whenever a packet is received, the process determines whether the packet is in the counting table. When the packet is in the table, the process increments a frequency counter. When the packet is not in the table, the process may add the packet to the table, and may set a frequency value for the packet to some initial value. For example, the initial value may be greater than or equal an optimized lower bound and less than or equal to a maximum value. Periodically, the process may decrement the frequency value for all the entries in the counting table. Also periodically, and usually less frequently, the process may delete entries in the counting table that have a frequency value under a certain threshold. The counting table thus may store information for packet flows that have packets continuously passing through—which are likely to be large flows—while flows whose packets stop arriving are removed from the counting table.

Another method for identifying large flows is called Probabilistic Fading Lossy Counting. Probabilistic Fading Lossy Counting is similar to Lossy Counting, but the rate at which entries are removed from the counting table may not be constant. Probabilistic Fading Lossy Counting assumes that large flows tend to be continuous. This method further assumes that decrementing the frequency value for entries that are not receiving packets by one per period may cause these entries to be removed from the counting table too slowly, resulting in memory being occupied that should be freed. Thus a Probabilistic Fading Lossy Counting process may more quickly decrement the frequency value, and cause entries in the counting table to be removed more quickly.

Another method for identifying large flows is referred to as Space Saving. A process that implements Space Saving may also include a table for storing information about packet flows. In this process, the table entries include a value indicating how many packets have been seen for a flow, and/or how recently packets have been seen for the flow. When the table is full, the entry with the fewest packets seen, or that has seen no packets for a long time, will be replaced.

Figure 3:
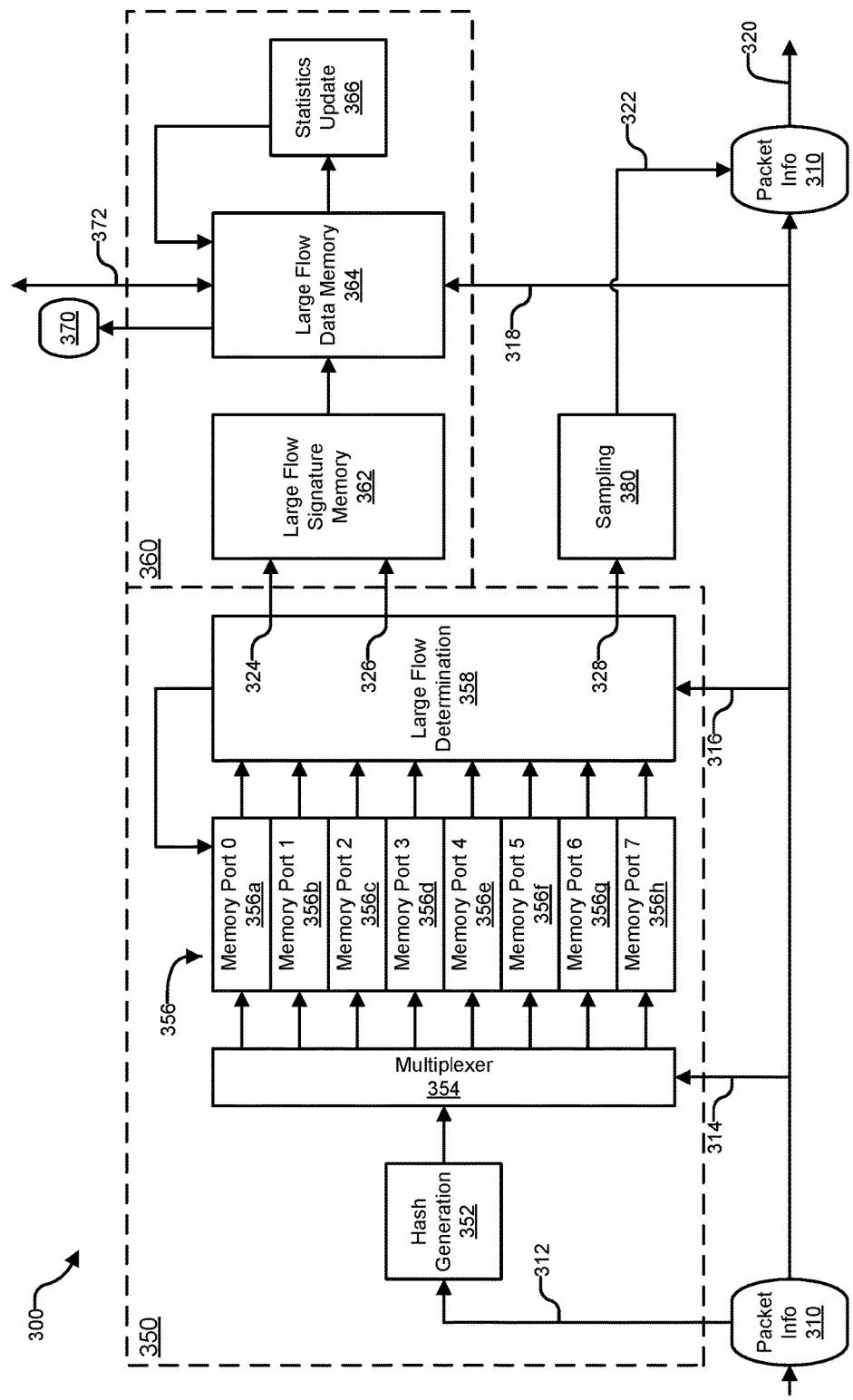
FIG. 3 illustrates an example of an integrated circuit for network visibility monitoring, configured to detect large flows, and cache large flows while sampling small flows.

FIG. 3 illustrates an example of an integrated circuit 300 for network visibility monitoring, configured to detect large flows, and cache large flows while sampling small flows. The circuit 300 may include logic modules for large flow detection 350, large flow caching 360, and sampling 380. The circuit 300 may also include a clock signal, not illustrated here, driven by a clock circuit. The circuit 300 may receive packet information 310 at a cycle of the clock signal. New packet information 310 may arrive at every cycle of the clock signal, or may arrive after some number of clock cycles have passed. The circuit 300 may be implemented in all or part as an SOC, an ASIC, or an FPGA, or in a combination of devices.

The large flow detection 360 logic may implement filtering to identify and separate large flows from small flows. To implement filtering, the large flow detection 360 may include a hash generation module 352, a multiplexer 354, a counter memory 356, and a large flow determination module 358.

The large flow detection 360 logic may receive the packet information 310 at the hash generation module 352. At the hash generation module 352, the large flow detection 360 logic may extract identification information 312 identifying a packet flow from the packet information 310. The identification information 312 may include, for example, a source IP address, a destination IP address, a source port, a destination port, and/or an IP protocol, or some other information typically found in a packet header that may convey source, destination, protocol, class, and/or type information. In some implementations, the identification information 312 may be derived from Layer 3 and/or Layer 4 header data. Layer 3 and Layer 4 are defined by the Open Systems Interconnect (OSI) model as the Network Layer and the Transport Layer, respectively.

The hash generation module 352 may use the identification information 312 identifying the packet flow to generate one or more keys. Specifically, the hash generation module 352 may include hash logic that operates on the identification information 312 to produce one or more hash values. The hash values may be used as keys to read the counter memory 356. Since all packets that belong to one flow generally include the same flow identification information 312, the hash generation module 352 should generate the same keys for all the packets in one flow. In some implementations, the hash generation module 352 may generate only one key. In various implementations, the hash generation module 352 may generate more than one key. For example, in one implementation, the hash generation module 352 generates three keys. In some implementations, the hash generation module 352 may have multiple hash logic modules, each implementing a different hash function, and each producing a different key.

The keys produced by the hash generation module 352 may be used to read the counter memory 356. In some implementations, the counter memory 356 may be divided into sub-sections or may consist of multiple small memories 356a-h. The multiplexer 354 may be used to select which of the small memories 356a-h may be read with the keys. Each small memory 356a-h may be associated with a port of the network device in which the circuit 300 is operating. For example, the network device may include eight ports for receiving packets, and the counter memory 356 may thus consist of eight small memories 356a-h. The packet information 310 may include a port number 314, where the port number indicates on which port the packet associated with the packet information 310 came in on. The port number 314 may be used as the select input to the multiplexer 354. The multiplexer 354 may direct keys from the hash generation module 352 to the small memory 356a-h associated with the port number 314.

The effect produced by the multiplexer 354 may be to filter packets based on the port on which the packet was received. Packets belonging to the same packet flow generally arrive on the same port of the network device, and so sorting the keys by port may assist in more quickly identifying a large flow. Furthermore, packets for small flows may be corralled to the memories 356a-h for their respective ports, and thus not inadvertently cause flows for other ports to be identified as large. In some implementations, the values for all the counters are stored in a single, large counter memory, and these implementations may not need multiplexer 354.

The counter memory 356 may store the current value for a number of counters. In some implementations, the counter memory 356 may also store state information for each counter. This state information may include, for example, "saturated," which may indicate that the counter is at or above a threshold value. As will be discussed in further detail below, this threshold value may be dynamically adjusted to change which flows qualify as large.

The large flow detection logic 358 may use the keys from the hash generation module 352 to read one or more counters from the memory 356. In some implementations, parts of one key may be used to read multiple counters. In some implementations, multiple keys may be used to read multiple counters, one counter for each key. The counter values may be sent to the large flow determination module 358. At the large flow determination module 358, each counter may be used to filter packet flows based on the amount of bandwidth used by the flow. As will be explained in further detail below, the counters attempt to track, for example, the number of bytes seen for a flow, and flows that have not reached a threshold may be filtered for processing as a small flow, while flows that have reached the threshold may be filtered for processing as a large flow. A packet size 316, typically in bytes, may be provided by the packet information 310 for this determination.

In many implementations, more than one counter is used, with each counter acting as a separate filter stage. When more than one counter is used, the logic implemented by the large flow determination module 358 may be called a multi-stage filter. These implementations may take into account the issue of collisions, where the identification information 312 for two flows may generate the same keys. Using multiple keys, and multiple counters, may reduce the probability of collisions. Use of multiple keys, or using parts of one key to read multiple counters, may also reduce the number of counters needed, and hence possibly the size of the counter memory 356. For example, a key that is 30 bits in length may $2^{30}$, or 1,073,741,824 counters. In contrast, three 10-bit keys require $3 \times 2^{10}$, or 3,072 counters. In various implementations, only one counter may be used.

The large flow determination logic 358 may examine the counters to determine whether the packet described by the packet information 310 is associated with a large flow or a small flow. The large flow determination logic 358 may first determine whether all of the counters were already at or above a threshold value when the values for the counters were read from the counter memory 356. When the counters were already at or above the threshold value, then the large flow determination logic 358 had previously determined that the flow identified by the packet information 310 is a large flow. In other words, a previous large flow has been found. In some implementations, the counters are unchanged when a previous large flow is identified.

When at least one of the counters is not at or above the threshold when the values for the counters were read from the counter memory 356, then the large flow determination may next add a packet size 316 from the packet information to each of the counters. In some implementations, the packet size 316 may only be added to counters that are below the threshold, while counters that are at or above the threshold are unchanged. In some implementations, a portion of the packet size may be added to one or more of the counters. For example, in some implementations, the packet size may be added to the lowest value counter. The remaining counters may then only be incremented to the value that results from adding the packet size to the lowest value counter. This method may further assist in distinguishing small flows from large flows. As another example, in some implementations, the counters are not increased beyond the threshold value.

When at least one counter is still below the threshold after adding the packet size 316, then the large flow determination module 358 determines that the flow identified by the packet information 310 is probably a small flow. When, however, all of the counters are at or above the threshold after adding the packet size 316, then the flow identified by the packet information 310 is likely a newly determined large flow.

After determining whether the flow identified by the packet information 310 is a large flow or a small flow, the large flow determination logic 358 may write the counter memory 356, to update the values for any counters that have changed.

When the flow identified by the packet information 310 is probably a newly identified large flow, a signal 324, usually including the keys generated from the flow identification information 312, may be sent to large flow caching 360. When the flow is likely a previously identified large flow, different signal 326 may be sent to large flow caching 360, also usually including the keys. As discussed in further detail below, new large flows and previous large flows may be treated differently by the large flow caching logic 360. When the flow is likely a small flow, a signal 328 may be sent to the sampling logic 380.

The large flow caching logic 360 may cache or store the identification information 312 for packet flows identified to be large. The large flow caching logic 360 may include a large flow signature memory 362, a large flow data memory 364, and statistics update logic 366. The large flow signature memory 362 and the large flow data memory 364 may be periodically read, at the end of a data collection interval, and the contents 370 read from the memories 362, 364 may be sent elsewhere for analysis. In some implementations, the memories may also be "flushed," or cleared, when they are read. When the memories are flushed any statistics maintained by the statistics updated logic 366 may be reset. The large flow caching logic 360 may also receive a control signal or set of signals 372. These control signals 372 may be used to read, write, and/or debug the large flow data memory 364. In some implementations, the control signals 372 provide a local or remote processor access to the large flow data memory 364.

The large flow signature memory 362 may be read using the keys generated from the flow identification information 312. For example, the keys received when a flow is identified as large may be concatenated, or otherwise combined into a single value. This single value, which is referred to herein as a signature, may be used to read the large flow signature memory 362. In some implementations, the large flow signature memory 362 may be a content-addressable memory (CAM). A content-addressable memory may operate as an associative array, where the signature is used to search the memory and a match produces the index of the matching entry. The index produced by reading the large flow signature memory 362 may be used as an address to read the large flow data memory 364.

The large flow data memory 364 may store information about large packet flows identified by the large flow detection 350 logic. The large flow data memory 364 may store, for example, values 318 about a flow that have been extracted from the packet information 310, such as the identification information 312 that identifies the flow. The large flow data memory 364 may also store state information. For example, the entries in the large flow data memory 364 may include a sum of the sizes of packets identified as belonging to the same flow. As another example, the entries may store a lock indicator that may prevent the flow data in the entry from being replaced.

The statistics update logic 366 may update the large flow data memory 364. For example, when the large flow data memory 364 is read, counters and/or sums in the entry may be updated, or some or all of the values in the entry may be replaced. As another example, the entry that is read may be empty and new data may be written to the entry.

In some implementations, the large flow caching logic 360 may use one memory to store the flow data. In these implementations, the flow memory may be read using the signature generated from the keys, and/or the signature may be used to generate a read address. For example, in some implementations, the signature may be used to generate hash value, where the hash value is used as an address into the memory. The entries in the single memory may store information about identified large flows, such as flow identification information and/or state information.

In some implementations, the keys used to generate the signature may come from a signal 324 identifying the associated flow as a new large flow. When a new large flow is identified, the signature is probably not present in the large flow signature memory 362. In these cases, the signature may be written into the large flow memory 362 at an available entry. An associated entry in the large flow data memory 364 may also be initialized using values 318 from the packet information 310. In some cases, the large flow signature memory 362 and/or the large flow data memory 364 may have no free entries. When this occurs, in some implementations, the large flow caching logic 360 may update an overflow indicator. The overflow indicator may indicate that more large flows were identified than could be stored. The overflow indicator may be stored in a designated entry in the large flow data memory 364, and/or may be stored in a register in the statistics update logic 366. In some cases, the overflow indicator is a counter, and indicates how many packets were seen that caused an overflow. Alternatively or additionally, in some implementations, when the memories 362, 364 are full, the circuit may be configured to make the flow eligible for sampling.

In some implementations, the signal 326 for previous large flows may provide keys to the large flow caching logic 360. Typically, the signature for a previously-identified large flow can be found in the large flow signature memory 362, since, in all likelihood, at least one packet for that flow has already been seen and cached. The large flow signature memory 362 may be read to extract an index, and the index may be used to read the large flow data memory 364.

Once the corresponding entry is read from the large flow data memory 364, the large flow caching logic 360 may compare the flow identification information in the entry against the identification information 312 provided by the packet information 310. As discussed above, the keys used to generate the signature were themselves generated using hash logic. As also discussed above, it may be that the hash logic may produce identical keys for the identification information for two different flows. Thus the entry read from in the large flow data memory may be for a flow other than the one identified by the current packet information 310. When the flow identification information in the entry matches the identification information 312 provided by the packet information 310, then the entry in the large flow data memory is, in fact, for the same flow as is identified by the packet information 310. When this is the case, the large flow caching logic 360 may only need to update the entry in the large flow data memory 364. Updating may include, for example, incrementing a counter used to track how many packets have been seen for the flow, and/or adding the packet size to a sum stored in the entry.

When the flow identification information in the entry read from the large flow data memory 364 does not match the identification information 312 provided by the packet information 310, the stored flow information is likely for a different flow than the flow identified by the packet information 310. This situation may be referred to as a collision, or a collision error. In some implementations, when a collision occurs, the large flow caching logic 360 may replace the entry in the large flow data memory 364 with the values 318 provided by the current packet information 310. For example, in some implementations, the values in the entry are only replaced with the packet information 310 identifies a new large flows. When the entry is replaced, state stored in the entry may also be reset. For example, counters may be reset to zero, and/or a lock indicator may be set to "unlocked."

In some implementations, a lock indicator may prevent the entry from being replaced until the entry is cleared. In these implementations, the lock indicator may be set to "unlocked" when the corresponding entry is first written or is replaced. As the large flow caching logic receives packet information for packets in the same large flow, a counter stored in the data entry may be incremented. Once the large flow caching logic 360 has seen a certain number of packets for the same flow (e.g., 5, or 10 or some other configured value), the lock indicator may be set to "locked." Once locked, the entry may not be replaced until it has been cleared by being flushed. Once the entry is locked and a packet information 310 is received that identifies a flow other than the flow identified in the entry, in some implementations, the large flow caching logic 360 may update an error indicator.

In some implementations, the error indicator is a single bit that indicates some error has occurred. In other implementations, the error indicator may be a counter stored in each entry of the large flow data memory 364. In these implementations, the counter may be incremented for each packet information seen whose flow identification information does not match the flow identification information stored in the corresponding entry. Alternatively or additionally, in some implementations, the error indicator may include an estimate of how many different flows mapped to the same large flow data memory 364 entry, but did not match the entry stored there. This estimate may be made, for example, using a 32-bit field stored in every entry of the large flow data memory 364. In various implementations, the field may consist of more or fewer bits. When the large flow caching logic 360 receives flow identification information that does not match the stored identification information, a bit may be set in the 32-bit error field. Which bit is set may be determined using the keys generated from the identification information from the packet information 310. A selection of five bits from the keys, for example, may sufficiently distinguish the various possible non-matching flows. Additionally, once a bit is set, it may not be cleared until the memory entry is flushed. Traffic analysis may use this 32-bit field to estimate how many unique large flows mapped to the same entry in the large flow data memory 364.

The large flow caching logic 360 may be configured to periodically read the contents 370 of the large flow data memory 364, and, in some implementations, also the large flow signature memory 362. The large flow caching logic 360 may send the contents 370 to a local processor for analysis, and/or may send the contents 370 in one or more packets to a collector device on the network. In some implementations, the contents 370 of the large flow data memory 364 may be accompanied by a timestamp that captures the time at which the contents 370 were read. In some implementations, the contents 370 may instead or also be accompanied by a timestamp that captures the beginning of the data collection interval.

In some implementations, the large flow data memory 364 (and, is some implementations, the large flow signature memory 362) may be occasionally cleared or flushed. For example, the large flow data memory 364 may be cleared after the contents 370 are read out for analysis. As another example, software may clear the large flow data memory 364 and/or large flow signature memory 362 at any time. Clearing either memory 362, 364 may make each entry in the memory available for writing to. The counters in the counter memory 356 may also be cleared, and reset to zero. As noted above, the counters in the counter memory 356 may reach their threshold value, and the large flow signature memory 362 and the large flow data memory 364 may fill up. Flushing the memories 364, 364 and counters may function as a reset mechanism, so that the large flow detection logic 350 and large flow caching logic 360 can continue to detect and cache new large flows. In some implementations, large flow detection 350 and/or large flow caching 360 may be halted for however many clock cycles are required to read the large flow data memory 360 and flush the data.

The large flow data memory 364 may be read at the end of a pre-determined data collection interval. The interval may be configured to an initial value—for example, 10 seconds—and may be dynamically adjusted based on the usage of the large flow data memory 364. For example, when the error indicator indicates that many large flows were identified but mapped to the same entry in the large flow data memory 364, it may be that the large flow data memory 364 should be read and flushed more often. In this case, the interval may be reduced, so that the large flow data memory 364 is read and flushed more often. Similarly, when the overflow indicator is set too often, the large flow data memory 364 may also need to be flushed more frequently. As another example, in some cases, when the large flow data memory 364 is read, it may be found that the large flow data memory 364 has many unused entries. In these cases, the interval may be increased so that the large flow data memory 364 is read and flushed less frequently.

In some implementations, the data collection interval may initially be set to an initial value that is estimated to be reasonable. The interval may then be adjusted each time the large flow data memory 364 is read. In some implementations, the interval may be increased or decreased in one second increments or increments of a fraction of a second, or in gradually decreasing increments (e.g., one second, one half second, one quarter second, one eight second, etc.). In some cases, the increment may be increased when it is found that the interval has needed to be adjusted in the same direction more than once in a row. Ideally, the interval should be adjusted until there are no overflows or collision errors, and nearly every entry in the large flow data memory 364 is found to have been used when the contents 370 are read out. Since traffic patterns may change and may be imprecisely predictable, however, the ideal interval setting is not necessarily achievable, so the interval may continue to be adjusted to accommodate traffic fluctuations and unpredictability. Updates to the interval may be provided over the control signals 372 to the large flow caching logic 360. Alternatively or additionally, the large flow caching logic 360 may include logic for dynamically modifying the interval.

The usage of the large flow data memory 364 may also be used to adjust the threshold for the counters in the counter memory 356. As discussed above, the threshold may be used to determine when the counters have reached a certain count, where reaching or exceeding this count indicates that a large flow has been identified. Should the threshold be set too low, it may be that many small flows will be identified as large, possibly causing the large flow data memory 364 to overflow. Referring to the graph 200 of FIG. 2, when the threshold is set too low, the differentiating line 208 may be too far to the right, into the flat portion of the curve. When the threshold is set too high, the differentiating line 208 may be too far to the left, and the large flow data memory 364 may be underutilized. Ideally, the differentiating line 208 should be in the portion of the curve where it turns towards horizontal, though there is usually no one, perfect position. The pattern of network traffic may change, and, as discussed above, the number of flows that can be cached may be limited. Thus, in most cases, the threshold may be adjusted each time the large flow data memory 364 of FIG. 3 is read, and the differentiating line 208 may drift back and forth along the transition area of the curve.

How the threshold is adjusted may depend on how the large flow data memory 364 was used at the time it is read. When the large flow data memory 364 is read, it may be determined that too few entries in the memory 364 were used. This may indicate that too few large flows were identified, and possibly some were missed. In this case, the threshold may be increased. When the large flow data memory 364 is read and found to have overflowed, or there were too many collision errors, then it may be that too many small flows were identified as large. In this case, the threshold may be reduced. In some cases, it may also be that the large flow memory 364 was neither too empty nor too full, but the statistics kept for each flow show that few packets were received for one flow or another. This may also indicate that small flow were identified as large, in which case the threshold may be increased.

In some implementations, the threshold may be set to an initial, reasonable value. When the threshold needs to be increased it may initially be doubled. When the threshold needs to be decreased, it may initially be halved. The threshold may further be adjusted up or down gradually, for example by taking the difference of its previous and current values, dividing this difference in half, and using the result to add to or subtract from the current threshold value. The data in the large flow memory 364 may sometimes indicate a drastic change in the traffic pattern seen, such as for example a sudden increase in the number of large flows. In this case, the threshold may be adjusted by a large amount that does not take into account any previous setting for the threshold.

In some implementations, the threshold and/or the interval at which the large flow data memory 364 is read may be determined by an external process. For example, a processor located in the same network device as the circuit 300 may analyze the contents 370 of the large flow data memory 364, and determine new threshold and/or interval values. Alternatively or additionally, the circuit 300 may include logic for analyzing the contents 370 of the large flow data memory 364. Alternatively or additionally, the contents 370 of the large flow data memory 364 may be sent to a collector device in the network. The collector device may analyze the contents 370 from the large flow data memory 364, and determine new threshold and/or interval values. The collector device may send the new threshold and/or interval values to the network device that contains the circuit 300 in a packet. The network device may then configure the new threshold and/or interval values, for example using a local processor.

Adjusting the threshold and/or the interval at which the large flow data memory 364 is read aims to more accurately identify large flows from small. While large flows are cached by the large flow caching logic 360, small flows may marked for sampling by the sampling logic 380.

As noted above, the large flow determination logic 358 may send a signal 328 to the sampling logic 380 when the flow identified by the packet information 310 has been determined to likely be a small flow. The signal 328 may nominate the packet described by the packet information 310 for sampling. In some implementations, all packets identified as likely belonging to a small flow are nominated for sampling. In some implementations, the circuit 300 may be configured to sample packets from at least some large flows as well.

The sampling logic 380 may determine whether a packet nominated for sampling is to be sampled. In some implementations, the sampling logic 380 may include a counter. In these implementations, when the signal 328 nominates a packet for sampling, the counter may increment. The sampling logic 380 may also include a configurable, pre-determined limit. When the counter reaches the pre-determined limit, the packet that caused the counter to reach the pre-determined limit may be selected for sampling. The pre-determined limit may be, for example between 128 and 8192, resulting in between one out of 128 and one out of 8192 packets being selected for sampling. In some implementations, the sampling logic 380 may include a second configurable, pre-determined limit that determines how often packets from large flows are sampled. In some implementations, this second pre-determined limit may be greater than the pre-determined limit used to select packets for small flows, so that large flows are sampled less frequently.

In some implementations, when the sampling logic 380 selects a packet for sampling, the sampling logic 380 may set a value 322 in the packet information 310 to indicate that the packet is to be sampled. In some implementations, the packet information 310 may continue 320 to another circuit, not illustrated here. This other circuit may take a sample from the actual packet data by copying a number of bytes from the packet. In some implementations, the sampling logic 380 may be configured to take the sample. For example, the sampling logic 380 may be configured to fetch the packet data and copy bytes from the beginning of the packet. In some implementations, the sample may consist of the first 128 bytes of the packet. In some implementations, the sample size may be configurable. In some implementations, each sample may also include a timestamp, indicating the time at which the sample was taken.

The circuit that takes the samples may be configured to send the samples to a local processor for analysis. Alternatively or additionally, the circuit may temporarily store a number of samples and periodically transmit some or all of the samples in one or more packets. These packets may be addressed to a collector device on the network, which may be configured to analyze the contents of the samples. In some implementations, the collected samples may be transmitted when a certain number of samples have been collected. For example, when enough samples have been collected to fill a packet, the packet may be generated and sent. In some implementations, the collected samples may be transmitted at the end of a pre-determined data collection interval. For example, in some implementations, the collected samples may be sent at the end of the data collection interval, regardless of whether there are sufficient samples to fill a packet. In some implementations, this data collection interval is the same interval used to by the large flow caching logic 360. In some implementations, the data collection interval for the packet samples may be configurable. In some implementations, the collected samples may be transmitted when the memory storing the samples is full. In some implementations, the packets may include a timestamp that captures the time at which the samples were sent. In some implementations, the packets may instead or also include a timestamp that captures the beginning of the data collection interval.

Figure 4:
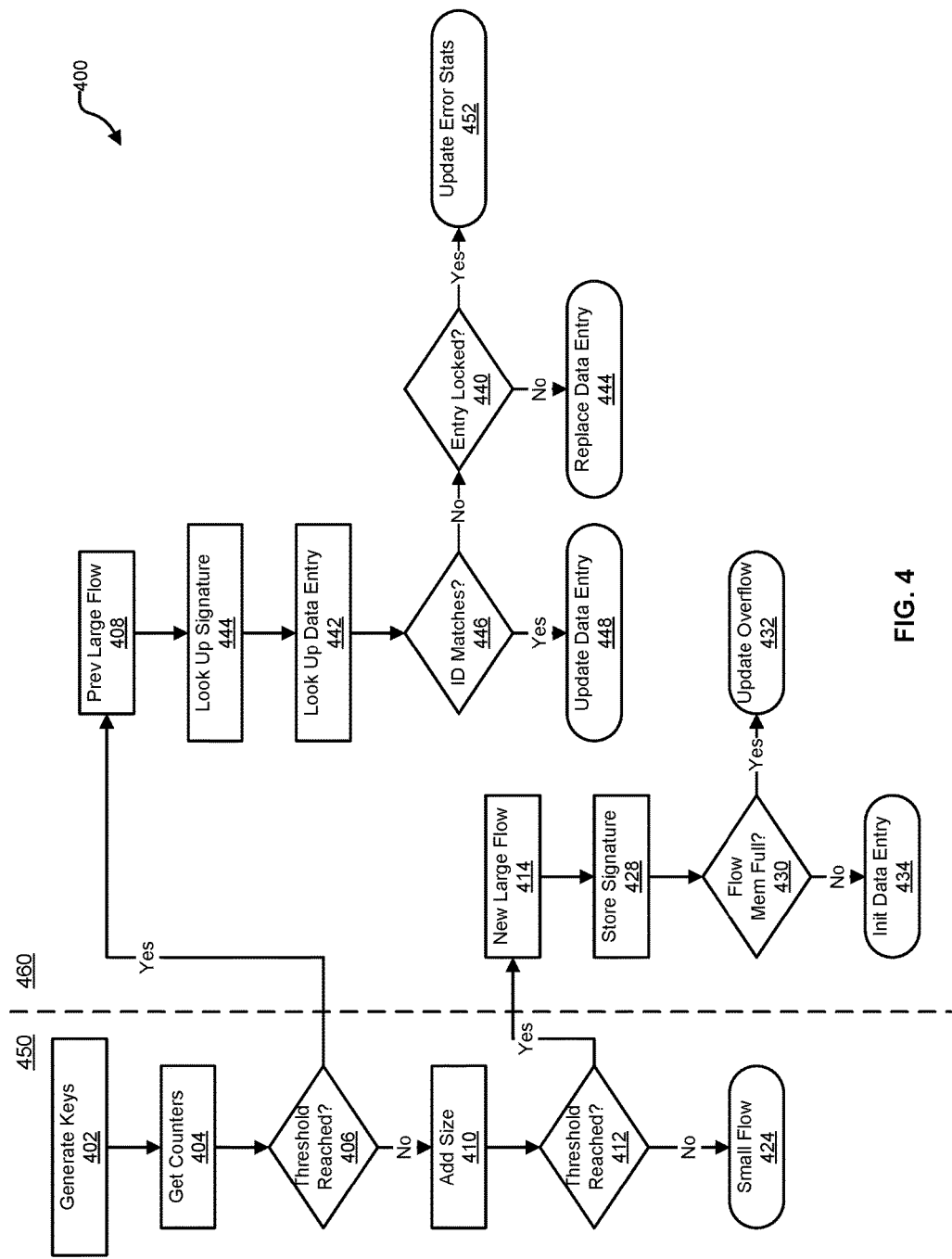
FIG. 4 illustrates an example of a process that may be executed by a circuit for network visibility monitoring.

FIG. 4 illustrates an example of a process 400 that may be executed by a circuit for network visibility monitoring, such as the circuit 300 of FIG. 3. The example process 400 of FIG. 4 is illustrated as including two stages. One stage includes steps for large flow detection 450. The other stage includes steps for large flow caching 460. The steps of the process 400 are illustrated for ease of understanding, and may, in various implementations, be implemented with more or fewer steps. In various implementations, the illustrated steps may be combined and/or may be executed in a different order than is illustrated. In some implementations, some of the steps are optional. In some implementations, the process 400 may be initiated at each cycle of a clock, with the receipt of new packet information.

The process 400 may begin when a circuit implementing the process 400 receives packet information that describes a packet. The packet information may be delivered to the large flow detection 450 process. At step 402, with the circuit implementing the process 400 may generate one or more keys. The keys may be generated from information identifying a packet, provided by the packet information. The keys may be generated using hash logic. The keys may represent the identification information for the flow in fewer bits. Multiple keys may be used to reduce the occurrence of the same keys being generated for different flows. Three keys have been found to be practical, though more or fewer keys may be generated.

At step 404, the circuit may get one or more counters, one counter for each of the keys generated at step 402. The counters each may act as a filter for the flows, as described below, and together be used to determine whether a flow is large or small.

At step 406, the circuit may check the value of the counters retrieved at step 404 against a threshold. Each counter is separately checked against the threshold, and in some implementations, the counters are checked in parallel. When all of the counters are at or above the threshold, then the packet likely belongs to a previously-identified large flow, and the process proceeds to step 408, described below. When at least one counter is below the threshold, the packet may belong to a small flow, and the process 400 proceeds to step 410. At step 410, all or part of the size of the packet may be added to each of the counters, or at least to any counter that is below the threshold. The packet size may be provided by the packet information that is being processed. After at least a portion of the packet size is added to the counters, the circuit may, at step 412, again check the counters against the threshold. If all of the counters now are at or above the threshold, then the packet likely belongs to a new-identified large flow, and the process proceeds to step 414, described below. If at least one counter is still below the threshold, then the circuit has probably identified a small flow. In this case, the large flow detection 450 portion of the process 400 terminates at step 424, having identified a small flow. The associated packet may be further processed according to processes for small flows; for example, the packet may be sampled.

Returning to step 412, when, after having added at least part of the packet size to the counters at step 410, the circuit determines that all of the counters are at or above the threshold, the process 400 proceeds to step 414, having identified a new large flow.

Here, the process 400 moves into flow caching 460. From step 414, the process 400 proceeds to step 428, where the circuit stores a signature for the newly-identified large flow. The signature may be generated from the keys generated at step 402. The keys may be concatenated, or otherwise combined to form the signature. The circuit may include a flow memory, in which the signature may be stored.

The process 400 may next store or cache information about the newly-identified large flow. At step 430, the circuit may check whether a flow memory is full. The flow memory may be full when all available entries in the flow memory are in use. When the flow memory is not full, the process proceeds to step 434, where an entry in the flow memory is initialized. Initializing the entry may include storing flow identification information provided by the packet information being processed, as well as initializing status information about the flow, and storing the status information in the entry.

When the circuit finds, at step 430, that flow memory is full, then at step 432, the circuit updates an overflow indicator. At this terminus of the process 400, the newly-identified large flow cannot be cached. The newly-identified large flow may, in some implementations, be nominated for sampling.

Returning to step 406, at this step the circuit may have found that all of the counters retrieved at step 404 were at or above the threshold. When all the counters were at or above the threshold before the packet size is added to them, the circuit may have found a previously-identified large flow. The process 400 proceeds to step 408, and moves into large flow caching 460.

At step 444, the circuit may generate a signature from the keys generated at step 402. The circuit may then look up the signature in the flow memory. In most cases, because the flow was previously identified as large, the signature is expected to be found. Finding the signature may enable the circuit to look up, at step 442 a data entry from the flow memory. The data entry may store information about a specific large flow.

At step 446, the circuit may check whether the flow identification information in the data entry matches the flow identification information provided the packet information that is currently being processed. Because the actual identification information is not used for the signature, but rather a hashed version of the identification information (that is, the keys), it may happen that the identification information for two different flows generate the same signature. This situation may be called a collision.

When no collision is detected at step 446 (that is, the stored identification information matches the identification information from the packet information), then, at step 448, the circuit may update the data entry. Updating the data entry may include, for example, incrementing a count of the packets seen for the associated flow, and/or adding the size of the packet to a sum.

When a collision is detected at step 446, then the process 400 may proceed to step 440, where the circuit checks whether the data entry is locked. The data entry may be locked when a certain number of packets have been seen for the flow identified in the data entry. For example, the data entry may include a counter that is increment each time a packet for the associated flow is seen. When the counter reaches a certain value (for example five), an indicator stored in the data entry may be set to indicate that the entry is locked.

At step 440, when the circuit determines that the data entry retrieved at step 442 is not locked, the circuit may proceed to step 444. At step 444, the data entry is replaced, using values provided by the packet information. Any state information stored in the data entry may also be reset. It may be assumed, that the flow information originally stored in this data entry is no longer significant because, for example, the flow has ended. Alternatively or additionally, some inaccuracy may be acceptable here, with capturing new data being prioritized over retaining old data.

When, at step 440, the circuit determines that the data entry retrieved at step 442 has been locked, the circuit determines that information for the flow identified by packet information cannot be cached. The circuit may thus proceed to step 452, and update error statistics. The error statistics may keep track of, for example, the number of times a collision was seen for this data entry, and/or an approximation of how many individual flows collided on this data entry.

With the process 400 illustrated in FIG. 4, a circuit may be able distinguish large flows from small flows. Large flows may further be measured using flow caching. Because only large flows are cached, it may be possible capturing information about most or all large flows seen during a data collection interval. Flow caching may provide useful information about large flows, because flow caching provides, for example, the identification information for flows, a number of packets seen for the flow, and/or a size, in bytes, of the flow.

Small flows, in turn, may be measured using packet sampling. By sampling only packets from small flows, the sample data may be more meaningful. Furthermore, the sampling rate may also be increased, since the large volume of packets from large flows will not be sampled. Sampling may be especially useful for packets from small flows because sampling provides an actual piece of the packet for analysis.

Thus identifying large and small flows and measuring them differently, more accurate measurement of each may be possible.

III. Unique Flow Estimation

Data samples from packets may provide useful information about the packets, but it may be difficult to use this data to determine how many flows were seen traversing a network node, or to make any other conclusions about the small flows. Some flows may also be missed entirely, and no information may be determined for these flows.

Having some estimate of the number of flows seen at a network node may be particularly useful when examining the operation of a network. Unique flow estimation may provide insight into the number of flows actually seen. This information may be correlated against the sampled data and the cached data, and provide network engineers with an indication of the scope and/or quality of the sampled data.

Figure 5:
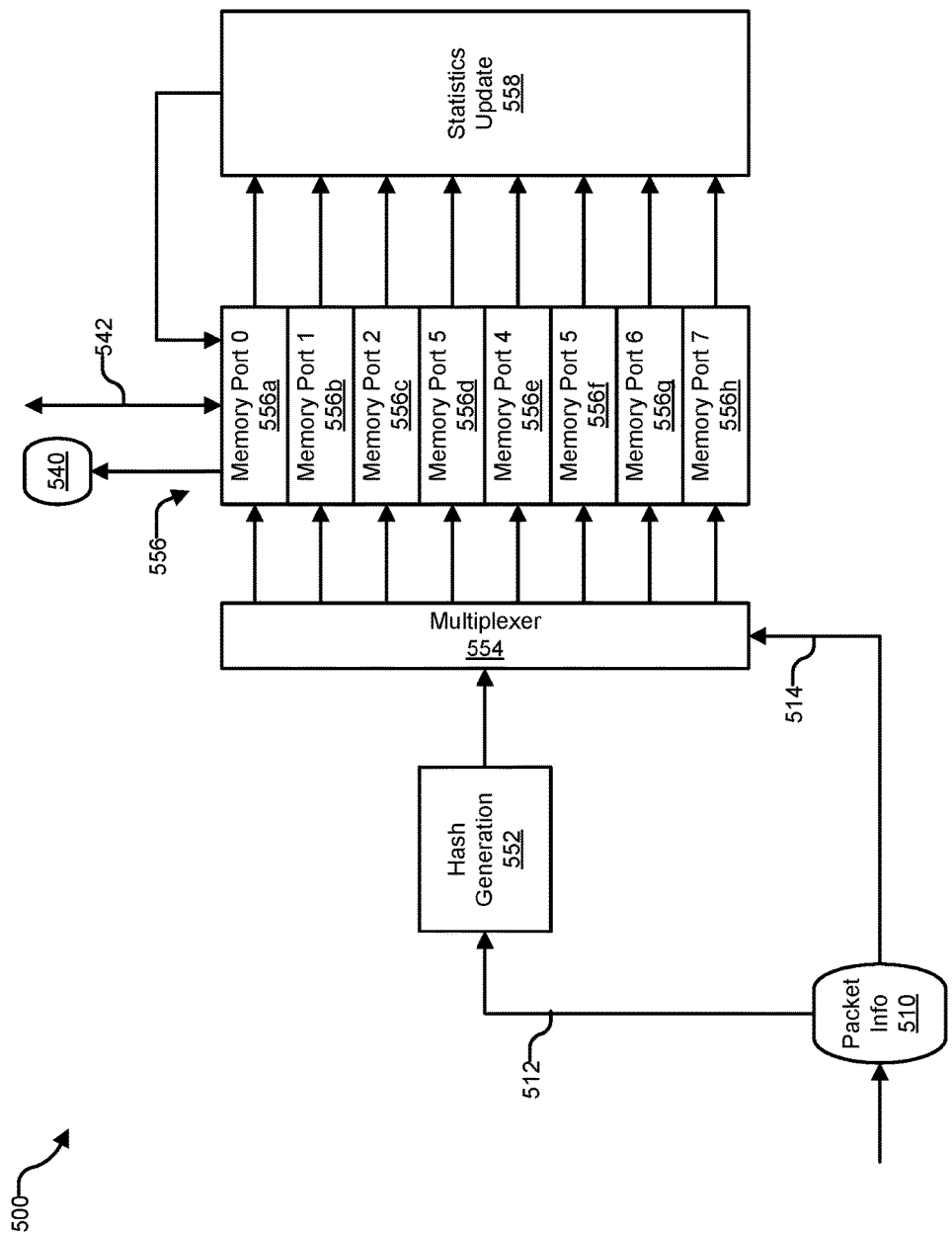
FIG. 5 illustrates an example of a circuit for unique flow estimation.

FIG. 5 illustrates an example of a circuit 500 for unique flow estimation. The circuit 500 may be included in a larger circuit that includes large flow detection, large flow caching, and sampling logic, and possibly also other logic. In such a larger circuit, the unique flow estimation circuit 500 may receive the same packet information 510 received by large flow detection logic. The circuit 500 may receive packet information for a pre-determined data collection interval. In some implementations, this interval is the same as the interval used by the large flow caching logic. In some implementations, the circuit 500 estimates the number of unique flow among all flows, regardless of size. In some implementations, the circuit 500 may be configured to estimate only the number of unique small flows and/or the number of unique large flows. The circuit 500 may be implemented in all or part as a SOC, an ASIC, or a FPGA, or in a combination of devices.

The unique flow estimation circuit 500 may use a combination of techniques to estimate the number of unique flows seen. The first method is known as the HyperLogLog algorithm. HyperLogLog is a method for approximating the number of distinct elements in a set of data. When the data set is very large, determining an exact number of elements in a data set may require a larger amount of memory than is practical. A probabilistic estimator, such as HyperLogLog, may require significantly less memory, while at the same time providing an estimate that may have a low margin of error.

To implement the HyperLogLog algorithm, the example circuit 500 may include hash generation logic 552, a multiplexer 554, a unique flow estimation table 556, and statistics update logic 558. The unique flow estimation table 556 may be read at the end of the data collection interval, and the contents 540 may be sent elsewhere for analysis. The circuit 500 may further receive a control signal or set of signals 542. The control signals 542 may be used to read, write, and/or debug the unique flow estimation table 556. In some implementations, the control signals 542 provide a local or remote processor access to the unique flow estimation table. The circuit 500 may also include a clock signal, not illustrated here, driven by a clock circuit. The circuit 500 may receive packet information 510 at a cycle of the clock signal. New packet information 510 may arrive at every cycle of the clock signal, or may arrive after some number of clock cycles have passed.

The hash generation logic 552 may use identification information 512 identifying a packet flow to generate a key. The identification information 512 may be extracted from the packet information 510 received at a cycle of the clock signal. The identification information may include, for example, a source IP address, a destination IP address, a source port, a destination port, and/or protocol information for the packet associated with the packet information 510. In various implementations, other information that can be found in packet headers may be used in various combinations to provide information that identifies a flow. The key may be generated, for example, using hash logic. The identification information may be provided to the hash logic to provide a hash value, which may be used as the key. In some implementations, for example, the key is a 64-bit value.

The hash generation logic 552 may use all or part of the key to index the unique flow estimation table 556. In some implementations, the unique flow estimation table 556 may be divided into sub-sections, or may be implemented as multiple small memories 556a-h. The multiplexer 554 may be used to select which of the small memories 556a-h may be read by the key. Each small memory 556a-h may be associated with a port of the network device in which the circuit 500 is operating. For example, the network device may include eight ports for receiving packets, and the unique flow estimation table 556 may thus consist of eight small memories 556a-h. The packet information 510 may include a port number 514, where the port number indicates the port on which the packet described by the packet information 510 was received. The port number may be used as the select input to the multiplexer 554. The multiplexer 554 may direct the key from the hash generation logic 552 to the small memory 556a-h associated with the port number 514.

Using multiple small memories 556a-h, each associated with a specific port, may operate to filter packet information based on the port on which the associated packet was received. Packets belonging to the same flow generally arrived on the same port of a network device, so sorting keys by port may serve to further segregate individual flows. In some implementations, the unique flow estimation table 556 is implemented with only one, large memory, and a port number 514 is not used to sort keys by port. These implementations may need to include the multiplexer 554.

The unique flow estimation table 556 may store a number of counters. A part of the key generated by the hash generation logic 552 may be used to read a counter, and a part of the key may be compared against the counter value. For example, the unique flow estimation table 556 may have 2048 entries, where each entry is a 6-bit counter. In this example, twelve bits from the key may be used to read an entry from the unique flow estimation table 556. The remaining 52 bits may be used to determine a count value. The count value may be, for example the number of leading zeroes contained in a part of the key. For example, the key may have the binary value "000110110 . . . ," which has three leading zeros. In various implementations, the number of bits used to read the unique flow estimation table 556 may depend on the size of the unique flow estimation table 556. In various implementations, the number of bits examined for leading zeros may vary, and/or may overlap with the bits used to read the unique flow estimation table 556. In various implementations, the bits may be examined for trailing zeros, leading ones, and/or trailing ones, or some combination of zeros and ones.

The circuit 500 may compare the count value determined from the key against the count value read from the unique flow estimation table 556. In some implementations, when the count value from the key is greater than the stored count value, the count value in the unique flow estimation table 556 may be replaced with the count value from the key. The statistics update logic 558 may write the new count value into the unique flow estimation table 556 at the same index that was read.

The theory behind this method is that it is unlikely that the identification information for two flows will generate the same key. This occurrence may still happen, however, but the margin of error—which generally depends on the number of entries in the unique flow estimation table 556 and the number of flows seen during the data collection interval—for this method is nevertheless reasonably low.

The unique flow estimation table 556 may continue to be updated in this manner until the end of the data collection interval. At the end of this interval, the unique flow estimation table 556 may be read, and the contents 540 may be sent to a local processor for analysis. Alternatively or additionally, the contents 540 may be sent in one or more packets to a collective device on the network. When the unique flow estimation table 556 is read, it may also be cleared, so that the estimation restarts in the next data collection interval.

An analysis tool may be able to generate an estimate for the number of unique flows seen during the data collection interval. The HyperLogLog algorithm assumes that, for each entry in the unique flow estimation table 556, the stored count value can be used as an exponent of two—that is, $2^{count\ value}$—to produce to approximate the cardinality of a data set. Furthermore, the harmonic mean of many of these estimates from a single data set may reduce the error. For example, a unique flow estimation table 556 with 2048 entries has a standard error of 1.625% when the number of unique flows is greater than about 10,000 flows.

The HyperLogLog algorithm has been found to be very good at estimating the number of unique flows when the number is large (e.g., over 10,000). HyperLogLog is less accurate, however, when the number of unique flows is small. The circuit 500 may thus also implement an algorithm called linear counting. Linear counting is known to be good at estimating cardinality when the number of elements in a data set is small.

The circuit 500 may implement linear counting using a large bitmap. The circuit 500 may include a register or memory for this large bitmap, or the bitmap may be stored in the unique flow estimation table 556, as described in further detail below. Each index in the bitmap may initially be set, for example, to zero. An index in the bitmap may be selecting using a key generated by the hash generation logic 552. The selected index may then be set to one. When the bitmap is read, an analysis tool may determine how many bits in the bitmap were set to one, and how many were set to zero. The number of bits set to one may provide an estimate of how many unique flows were seen. The bitmap may also be cleared (set to all zero) when it is read.

In some implementations, the unique flow estimation table 556 may serve as the large bitmap. In some cases, the linear counting data can occupy the unique flow estimation table 556 at the same time as the HyperLogLog data. For linear counting, a unique flow estimation table 556 entry may be read using all or part of a key generated by the hash generation logic 552. When the key displays a particular value—for example, the key has no leading zeros—and the entry read from the unique flow estimation table 556 is also zero, the circuit 500 may write a value of one to the entry. When the entry read from the unique flow estimation table 556 has a non-zero value (e.g. it may have been written to by HyperLogLog counting) and the key displays the particular value, the entry in the unique flow estimation table 556 may be left as it is. In this way, all entries in the unique flow estimation table 556 that are not zero represent indices in the bitmap that are set to one, while entries with a zero value represent indices in the bitmap that are set to zero. As the number of unique flows increases (e.g., exceeds 10,000) it has been found that the number of leading zero values in the key tends to be greater than one, and linear counting becomes less accurate. But as linear counting becomes less accurate, HyperLogLog counting becomes more accurate. Thus linear counting may not adversely affect the performance of the HyperLogLog algorithm.

In some implementations, the circuit 500 can be configured to switch between HyperLogLog and linear counting. For example, the circuit 500 may initially configured to use HyperLogLog. When the unique flow estimation table 556 is read, an analysis tool may determine that the estimated number of unique flows is below a certain threshold. When this is the case, the circuit 500 may be configured to use linear counting. When the estimated number of unique flows is later found to be over the threshold, then HyperLogLog can be enabled.

The data produced by the unique flow estimation circuit 500 can be used to better understand the flow measurement data collected by flow caching and packet sampling. For example, packet sampling alone provides little information about the number of flows represented by the sampled data. Samples may have been taken, for example, for 10,000 packets, but it is difficult to determine if those samples represent 100 flows or 500 flows or more. Furthermore, how many flows were not sampled at all is unknown.

Flow caching data, however, may indicate reasonably accurately how many large flows were seen during a data collection interval, assuming little or no overflow and few or no collision errors. The number of large flows can thus be subtracted from the estimated number of unique flows, thus providing an estimate of the number of small flows. An estimate of the number of small flows may indicate that, for example, the 10,000 packets were for 50,000 flows, and that thus 500 flows were sampled. This insight provides a better understanding of the flows seen at a network node.

Furthermore, an estimate of the number of unique flows may provide an estimate of the distribution of small flows seen in the sampled data. Having an idea of the distribution of the small flows may provide insight into how much data there was in each flow, and/or how long each flow lasted.

IV. Historically Large Flows

The large flow detection logic described with respected to FIGS. 1 and 3 aims to identify large packet flows. The large detection flow logic may identify large flows by first generating keys from information identifying a packet flow, where the flow identification information is provided by packet information describing a packet. The keys may be generated, for example, using hash logic. Each key may then be used to read a counter from a counter memory. When read, the counters may all be at or over a threshold, in which case the flow is a previously-identified large flow. When at least one counter is not at or over the threshold, but all the counters are at or over the threshold after the size of the packet has been added to them, then the flow is a newly-identified large flow.

The large flow caching logic then may be used to store information for flows identified as large. The large flow caching logic may include a flow memory, where each entry in the flow memory may be used to store information about a different large flow. The entries may, for example, store the identification information for a flow and statistics, such as the number of packets seen for the flow and/or a sum of the size of the packets seen for the flow. The flow memory may be periodically read the data and send the data elsewhere for analysis. When the flow memory is read, it may also be cleared. In some implementations, clearing the flow memory may be the only way to make entries available for storing information for flows that have never been seen before. The counters in the large flow detection logic may also be reset to zero.

Clearing the flow memory at the end of a data collection interval is simple to implement, but at the start of the next data collection interval, packets associated with flows already identified as large in the previous data collection interval may initially be misidentified as belonging to a small flow. This may occur because some number of packets from a large flow may need to be received before the counters in the large flow detection logic reach the threshold. For example, assume that the threshold is set to 1% of the total bandwidth being received, meaning that packet flows that use more than 1% of the bandwidth will be identified as large. Next assume that there is a single packet flow that contributes 3% of that total bandwidth. All the packets received for this one flow will be identified as associated with a small flow until the counters reach the 1% level. Subsequently, only packets in the remaining 2% will be captured by the large flow caching logic.

One method for capturing the 1% of bandwidth that is missed in the previous example is to automatically add the threshold amount to a flow's statistics when a large flow is first identified. The number of packets that would have caused the counters to reach the threshold may be estimated and stored in the flow memory. The number or amount to add may be based on a distribution of bytes-per-packet. A limitation of this method is other flows may be incrementing the same counters. While the mechanism for generating keys and the use of multiple keys may minimize the occurrence of two flows using the exact same counters, this may nevertheless occur. Thus adding the threshold amount to a flow's statistics when a new large flow is identified may cause over-measurement of the flow. For example, returning to the prior example, packets for unrelated flows may have been received that raise the counters for a large flow to 0.5% of the total bandwidth. For the single flow that provides 3% of the bandwidth, 0.5% will not be captured because the counters will be below the threshold. The remaining 2.5% will be captured, but if 1% is automatically added to the captured bandwidth in the flow memory, then the bandwidth may be overestimated at 3.5%.

Another method for capture packets from flows identified as large before the flow memory was flushed is to keep the information for these flows in the flow memory, rather than clearing them when the flow memory is read. The flows whose information stays in the flow memory across data collection intervals may be called historically large flows. Keeping flow information in the flow memory between data collection intervals may require determining that packets belong to a large flow when the counters indicate that they do not. This method may also require determining when the information for a flow should be "aged out" and be cleared from the flow memory. Entries in the flow memory will need to be freed at some point, so that information for entirely new large flows can be stored.

Figure 6A:
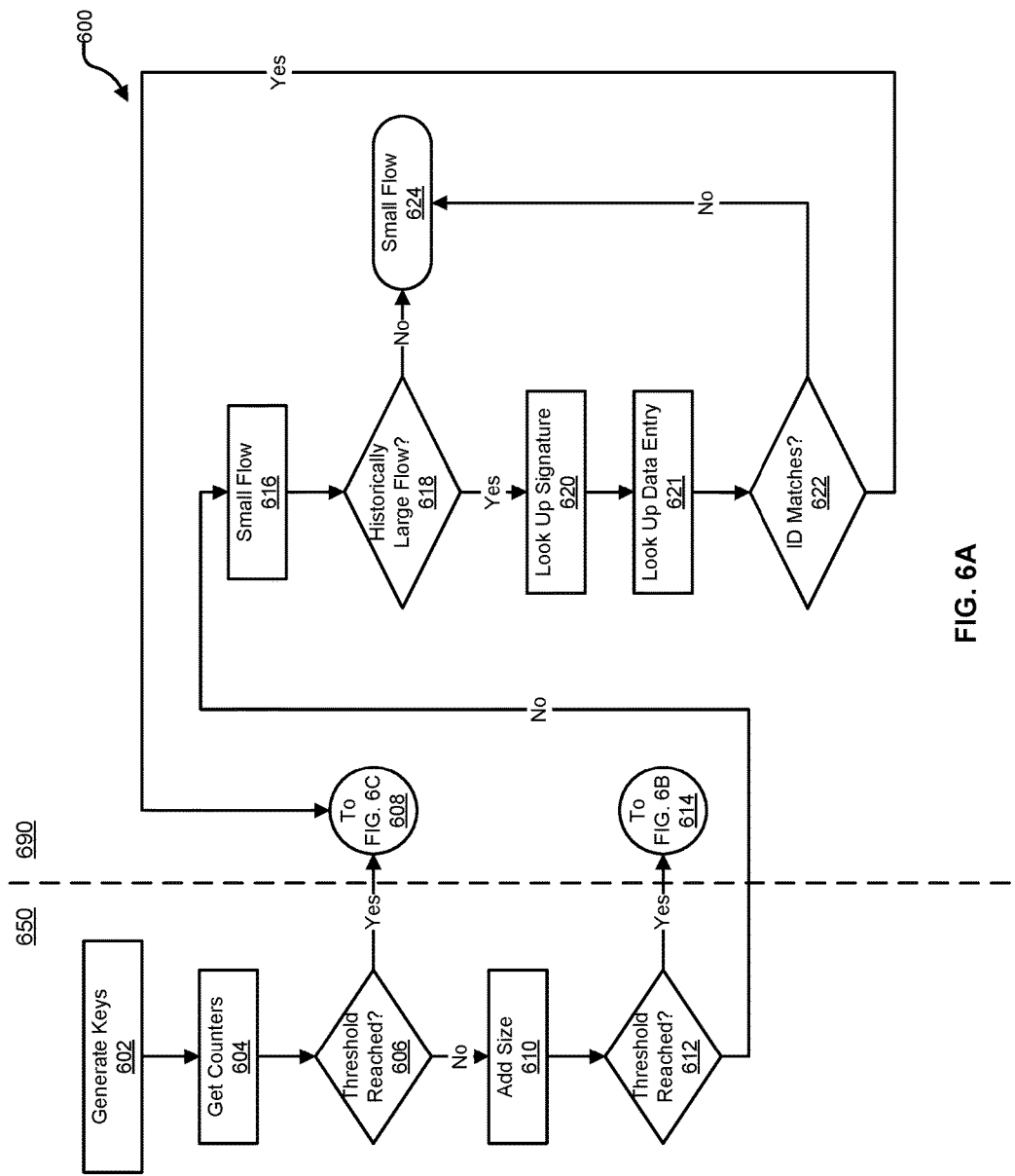
FIGS. 6A-6C illustrate an example of a process for identifying and processing historically large flows.
Figure 6B:
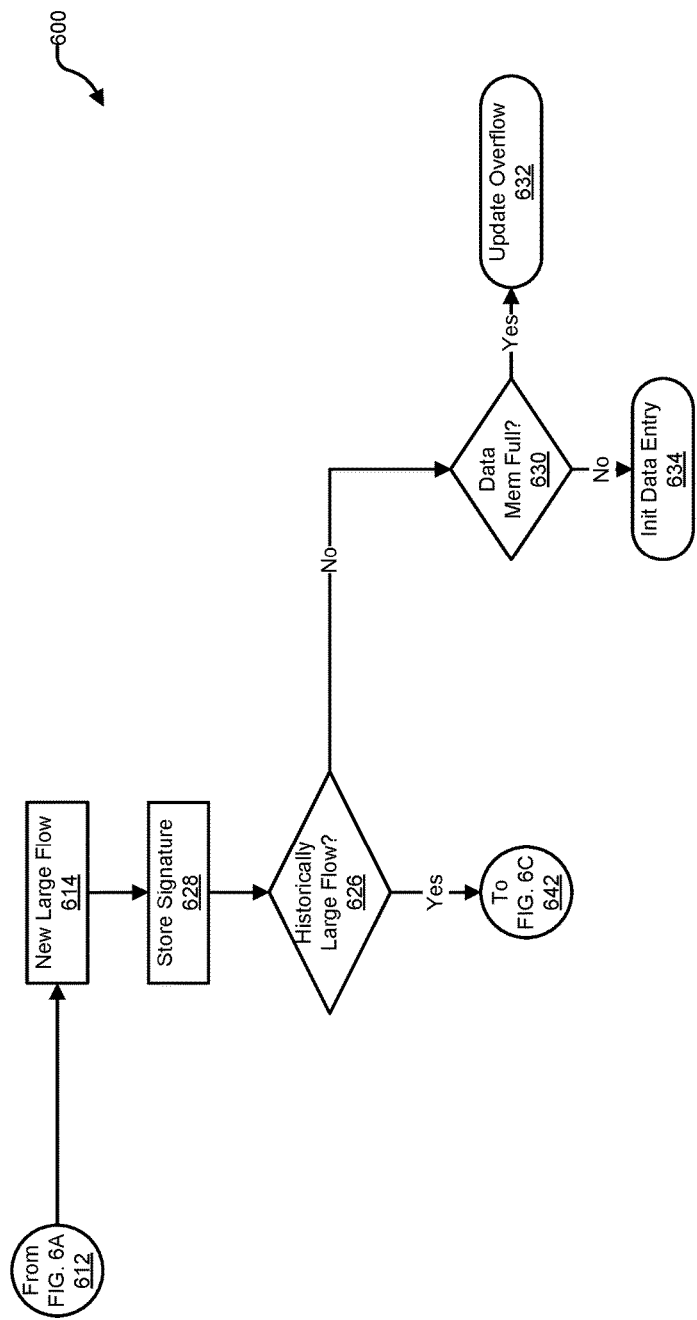
Figure 6C:
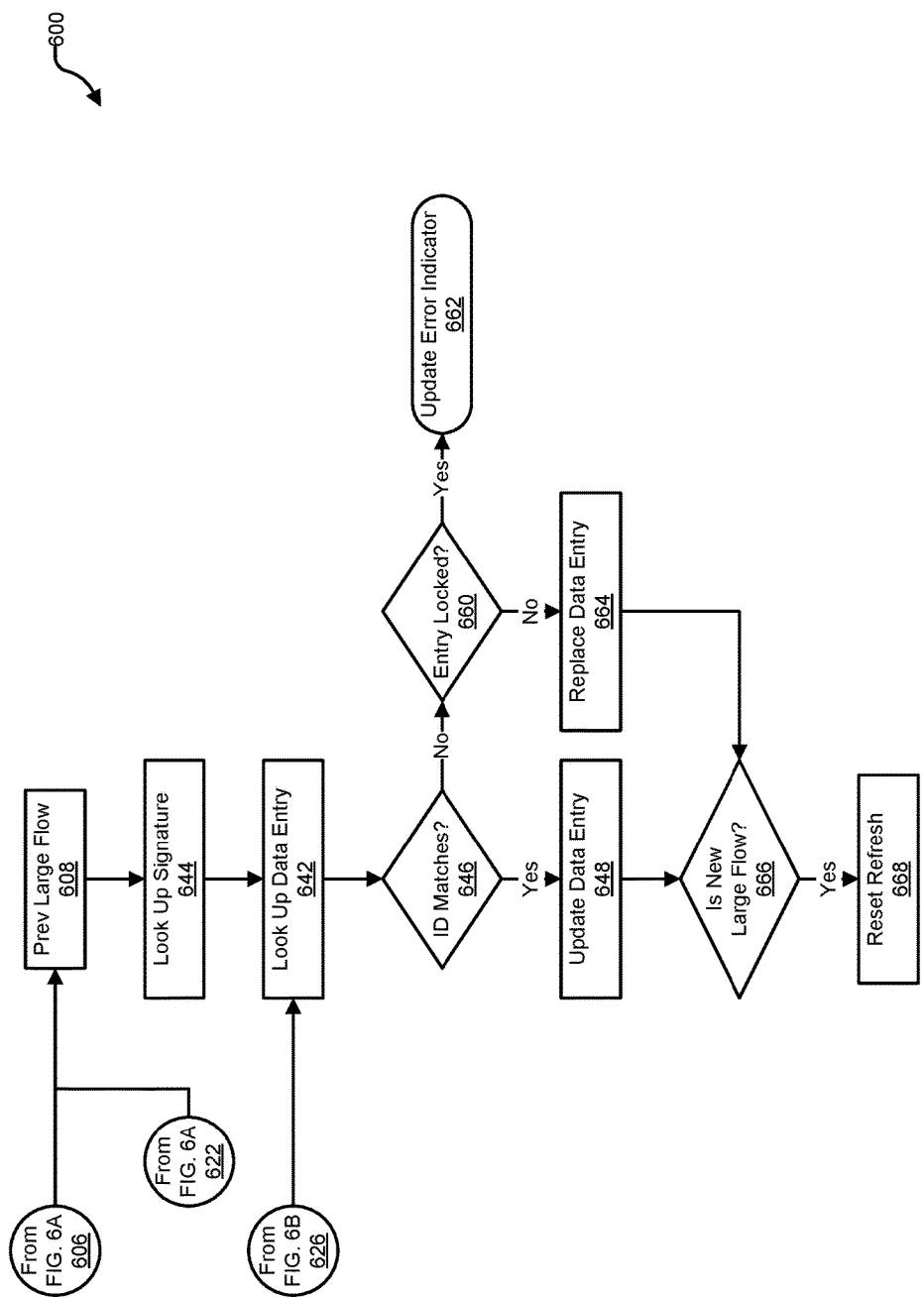

FIGS. 6A-6C illustrate an example of a process 600 for identifying and processing historically large flows. The process 600 may be executed by an integrated circuit, such as for example the integrated circuit 100 of FIG. 1. As will be explained in further detail below, the circuit that executes the process 600 of FIG. 6A-6C may include additional logic and/or storage for additional state information. The process 600 may include two stages. The first stage may include steps for large flow detection 650. The second stage may include steps for large flow caching 690, including large flows identified as historically large flows. The steps of the process 600 are illustrated for ease of understanding, and may, in various implementations, be implemented with more or fewer steps. In various implementations, the illustrated steps may be combined and/or may be executed in a different order than is illustrated. In some implementations, some of the steps are optional. In some implementations, the process 600 may be initiated at each cycle of a clock, with the receipt of new packet information.

The large flow detection 650 stage may begin when the circuit implementing the process 600 receives packet information describing packet. At step 602, the circuit may generate one or more keys. The keys may be generated from information that identifies a flow, where this identification information is provided by the packet information. The keys may be generated using hash logic. The keys may represent the identification information for the flow in fewer bits. Multiple keys may be used to reduce the occurrence of the same keys being generated for different flows. Three keys have been found to be practical, though more or fewer keys may be generated.

At step 604, the circuit may get one or more counters, one counter for each of the keys generated at step 602. The counters each may act as a filter for the flows, as described below, and together be used to determine whether a flow is large or small.

At step 606, the circuit may check the value of the counters retrieved at step 604 against a threshold. Each counter is separately checked against the threshold, and in some implementations, the counters are checked in parallel. When all of the counters are at or above the threshold, then the packet likely belongs to a previously-identified large flow, and the process proceeds to step 608 of FIG. 6C, described below. When at least one counter is below the threshold, the packet may belong to a small flow, and the process 600 proceeds to step 610 in FIG. 6A. At step 610, the size of the packet may be added to each of the counters, or at least to any counters that are below the threshold. The packet size may be provided by the packet information that is being processed. After the packet size is added to the counters, the counters may, at step 612, be again checked against the threshold. If all of the counters now are at or above the threshold, then it is likely that the packet information being processed identifies a new large flow, and the process proceeds to step 614 of FIG. 6B, described below. If at least one counter is still below the threshold, then likely a small flow has been identified, and the process 600 proceeds from large flow identification 650 to flow caching 690, at step 616 of FIG. 6A.

Having identified the packet as probably associated with a small flow at step 616, the process 600 next, at step 618, determines whether the identified flow is an historically large flow. To make this determination, each counter may have an associated state, where the state information is typically stored together with its associated counter in a memory. The state information may indicate whether a flow was previously identified as a large flow in a prior data collection cycle. An example of the state information is as follows: the state information for a counter may include, for example, four bits. One bit of the four is designated to track state for the current data collection cycle. Should any flow use the counter and be newly identified as a large flow, the current state bit may be set to 1. At the end of the data collection cycle, another bit of the four will be designated for tracking the current state. Thus each bit indicates a state for the counter in a previous data collection interval, and with four bits the history of the counter can be tracked for four data collection intervals. In various implementations, the state information may have more or fewer bits to track the state for more or fewer data collection intervals, respectively. In most cases, the counter will be cleared at the end of the data collection interval, but the state information will not be. The bit designated for tracking the state for the current data collection cycle, however, will be set to zero at the beginning of the new data collection interval.

When a set of counters are retrieved at step 604, the state information for each counter may also be retrieved. At step 618, the circuit may examine the state information for each of the counters. Continuing the example provided above, when the bit at a particular index is set in the state information for all of the counters, then the identified flow was previously identified as a new large flow. For example, the state information for three counters may be binary values 010, 111, and 010. Here, because the bits in the second position are set in all three of the state information bits, the flow whose keys read these counter was newly-identified as a large flow at least once within the last three data collection intervals. As noted above, there is a possibility that a different flow may have caused the bits in the state information to have been set, but as also discussed above, using multiple keys and counters may reduce the probability that the identification information for two flows produce the same keys, and use the same counters.

When at step 618, the circuit determines, using the state information for the counters, that the packet information has identified a flow that was not previously identified as large, the process 600 may then terminate at step 624, having identified a small flow. The associated packet may be further processed according to processes for small flows; for example, the packet may be sampled.

When, at step 618, the circuit determines that the packet information has identified a historically large flow, then the process may continue to step 620. At step 620, the circuit may generate a signature using the keys generated at step 402. The signature for the flow may be a combination of the keys. For example, in some implementations, the keys are concatenated to form the signature. The circuit may then look up the signature in a flow memory. The flow memory may store information about large packet flows. Since the flow has been identified as a historically large flow, in most cases the circuit should find the signature in the flow memory. Having found the signature in the flow memory, the process 600 may next, at step 621, look up the data entry associated with the signature. The data entry may store information about a specific large flow.

At step 622, the circuit may next determine whether the flow identification information provided by the packet information matches flow identification information stored in the data entry retrieved at step 621. When the identification information from the packet information does not match the identification information stored in the data entry, then the packet described by the packet information is associated with a different flow than is stored in the data entry. This may have occurred because two different flows happen to have generated the same keys. In this situation, it may be assumed that the flow identified by the packet information may, in fact, be a small flow. The process 600 may thus terminate at step 624, and treat the packet as belonging to small flow.

When, at step 622, the identification information from the packet information and the identification information stored in the data entry do match, the identified flow may, in fact, be a previously identified, historically large flow. In this case, the process continues to step 608 of FIG. 6C, described below.

Returning to step 612, at this step, the circuit may have determined that the counters retrieved at step 604 were at or over the threshold when the size of the packet was added to each counter. When the counters are at or over the threshold at this step, then the flow identified by the packet information is likely a newly-identified large flow. The process 600 thus continues to step 614 of FIG. 6B.

FIG. 6B illustrates the steps of the process 600 when the flow identified by the packet information may be a newly-identified large flow. From step 614 of FIG. 6B, the circuit may next, at step 628, and generate and store a signature for the newly-identified large flow. In some implementations, signatures for newly-identified large flows are always stored, even when the signature may already be in the flow memory from a prior data collection cycle. As noted above, two different flows may generated the same keys, and, hence, the same signature. Thus, while the counters' state information may indicate that the flow identified by the packet information is a historically large flow, the flow may, in fact be a truly new flow, and the state information may apply to a different flow.

At step 626, the circuit may next determine whether the flow identified by the packet information is an historically large flow. This step may involve examining the state information for the counters, as described above with regard to step 618. When the circuit determines that identified flow is, in fact, a historically large flow, the circuit may continue to step 642 of FIG. 6C, described below. When the circuit determines that the flow is not a historically large flow, then the identified flow may be a truly, newly-identified large flow, and the circuit may continue to step 630 of FIG. 6B.

At step 630, the circuit may determine whether the flow memory is full. When the flow memory is full there would be no entries available to store information for the newly-identified large flow. When this is the case, then at step 632 the circuit may update an overflow indicator. When the flow memory is not full, then at step 634 the circuit may initialize a new data entry for the newly-identified large flow. Initializing the new data entry may include, for example, storing the original identification information for the flow, initializing statistics information such as a count of the number of packet seen for the flow and a sum of the packet sizes for the packets in the flow, and/or initializing state information for the flow, such as a lock indicator and/or a refresh indicator.

Returning to step 626, at this step, the circuit may determine from the state information for the counters that the identified flow was, in fact, a historically large flow, and proceed to step 642 of FIG. 6C.

FIG. 6C illustrates the steps of the process 600 when a flow identified by the current packet information being processed is a previously-identified large flow. The flow may have been identified as a previously-identified large flow when, at step 606, the counters retrieved at step 604 of FIG. 6A were at or above the threshold when they were initially retrieved. The flow may also have been identified as a previously-identified large flow when, at step 612, the counters were below the threshold even after the size of the packet was added to the counters, but, at step 618, the state information for the counters indicated that the identified flow was a historically large flow.

At step 608 of FIG. 6C, the circuit may next, at step 644, generate and look up a signature for the previously-identified large flow. Because the flow is a previously-identified large flow, it is expected that the signature will be found in the flow memory. Having found signature, the circuit may next, at step 642, use the signature to look up a data entry for the flow.

At step 646, the circuit may next determine whether the flow identification information provided by the packet information matches flow identification information stored in the data entry. As noted above, two different flows may generate the same keys, thus the information in the data entry may, in fact, be for a different flow than the flow identified by the packet information currently being processed. When the identification information from the packet information matches the identification information in the data entry, then the flow identified from the packet information is likely the same flow whose information is stored in the data entry. When this is the case, the circuit may continue to step 648, described below.

When, at step 646, the identification information does not match, the circuit may continue to step 660. At step 660, the circuit may determine whether the data entry is locked. The data entry may be locked when a certain number of packets have been seen for the flow that is identified in the data entry. For example, once the data entry has been updated five consecutive times for the same flow identification information (e.g., packet information identifying the same packet flow has been received five times since the beginning of the data collection interval), then the circuit may set a lock indicator in the data entry. At step 660, when the data entry is locked, it cannot be replaced until it is cleared. Information from the packet information cannot be stored in this case, so the process terminates at step 662, where the circuit updates an error indicator. The error indicator may be stored in the data entry, so that statistics for specific uncaptured flows may be saved.

When, at step 660, the data entry is not locked, the circuit proceeds to step 664, and replaces the information stored in the data entry. It may be assumed that the flow whose information was previously stored in the data entry has ceased to be a large flow, or that the flow has ended. While some information for this flow may be lost, it may be preferable to begin capturing information for a new large flow. Replacing the information in the data entry may include resetting the lock indicator. After replacing information in the data entry, the circuit may next proceed to step 666, described below.

Returning to step 646, when the flow identification information provided the packet information matches the identification information stored in the data entry, the circuit may continue to step 648. At step 648, the circuit may update the data entry. Updating the data entry may include, for example, updating a count of the packet seen for the flow, and/or adding the size of the packet to a sum.

The circuit may next continue to step 666, where the circuit determines whether the flow identified by the packet information was newly identified as large flow by the large flow determination process 650. The flow is a newly-identified large flow when all the counters were found to be at or above the threshold only when the current packet information was processed, meaning the flow reached large flow status only the packet size in the current packet information is applied to some or all of the counters. At step 666, when the flow is not, in fact, a newly-identified large flow, no further action is required. When the flow is, in fact a newly-identified flow, the circuit may proceed to step 668.

At step 668, the circuit may reset a refresh indicator. As described below, the refresh indicator may be used to determine whether the data entry can be cleared.

During the data collection interval, the circuit may continue to receive packet information and execute the process 600. At the end of the data collection interval, the contents of the flow memory may be read and sent elsewhere for analysis. It may be desirable, once the contents of the flow memory have been read, to clear the flow memory so that entries may be available to store information for new flows. As discussed above, however, it may also be desirable to retain the information, so that packets for historically large flows can continue to be captured more accurately.

In some implementations, each entry in the flow memory may thus include a refresh indictor. The refresh indicator may indicate when an entry should be retained, and when the entry can be cleared after the flow memory has been read. The refresh indicator may use, for example, a counter. The counter may be set to a maximum value whenever, as at step 634 of FIG. 6B, the circuit first initializes a data entry, or when, as at step 666 of FIG. 6C, the information for newly-identified large flow is replacing information for another large flow. In some implementations, the counter for the refresh indicator may be relative to the state information for the counters. For example, when the state information stores the history for a counter for four data collection intervals, then the counter may be set to count down from four. In this way, the state information and the refresh counter may save state for the same number of data collection intervals.

The refresh indicator may be examined when the circuit reads each entry in the flow memory at the end of a data collection interval. When the refresh indicator indicates that the data entry can be refreshed, the circuit may clear the entry after reading the contents out. In some implementations, an associated signature may also be removed from the flow memory. When the refresh indicator indicates that the data entry is not yet ready to be refreshed, the circuit may instead update the refresh indicator. For example, the circuit may decrement a counter used as the refresh indicator. The counter may become zero here, but the circuit will not check the refresh indicator again until the end of the next data collection interval.

In some implementations, instead of a refresh indictor, the circuit may use the state information read with the counter at step 604 of FIG. 6A to determine whether an entry in the flow memory can be cleared. For example, the state information may store the history for its associated counter for a number of data collection intervals. The state information may thus indicate that a flow whose flow identifier is stored in a data entry has not been identified as a large flow for some number of data collection intervals. For example, the state information for three counters may be 010, 100, 101, which may indicate that for none of the last three data collection intervals has the flow been identified as historically large. In this example, the entry in the flow memory for the flow may be cleared.

In some implementations, a lock indicator associated with each entry in the flow memory may be cleared at the end of each data collection interval, regardless of whether the entry itself is cleared. In these implementations, the entry may be replaced in the next data collection interval with data for a new large packet flow. In some implementations, the lock indicator may only be cleared when the entry itself is cleared, such as when the refresh indicator indicates that that the entry can be refreshed. In these implementations, the large flow whose information is stored in the entry may be maintained as historically large across data collection intervals.

In various implementations, at the end of a data collection interval, the counters used in the large flow detection 650 stage of the process 600 may be cleared, that is, reset to zero. In most cases, the state information for each of the counters is not cleared, and the state information may be advanced to clear the oldest state information and to provide a space for state for the next data collection interval.

A circuit implementing historically large flows may be able to provide more accurate measurement for large flows. By saving information about flows already identified as large across data collection intervals, it may be possible to avoid misidentifying packets that belong to those flows as associated with small flows. In some implementations, a circuit that saves historically large flows may have additional bits to store state information for the counters, and to store refresh indicators for each data entry in the flow memory. In some implementations, the circuit may also have a larger flow memory to accommodate data entries for historically large flows, which may not be cleared very frequently. Alternatively, the counter threshold may be decreased, so that fewer flows qualify as large, which may have the added effect of increasing the accuracy of the measurement for the remaining large flows.

V. Network Switch

Figure 7:
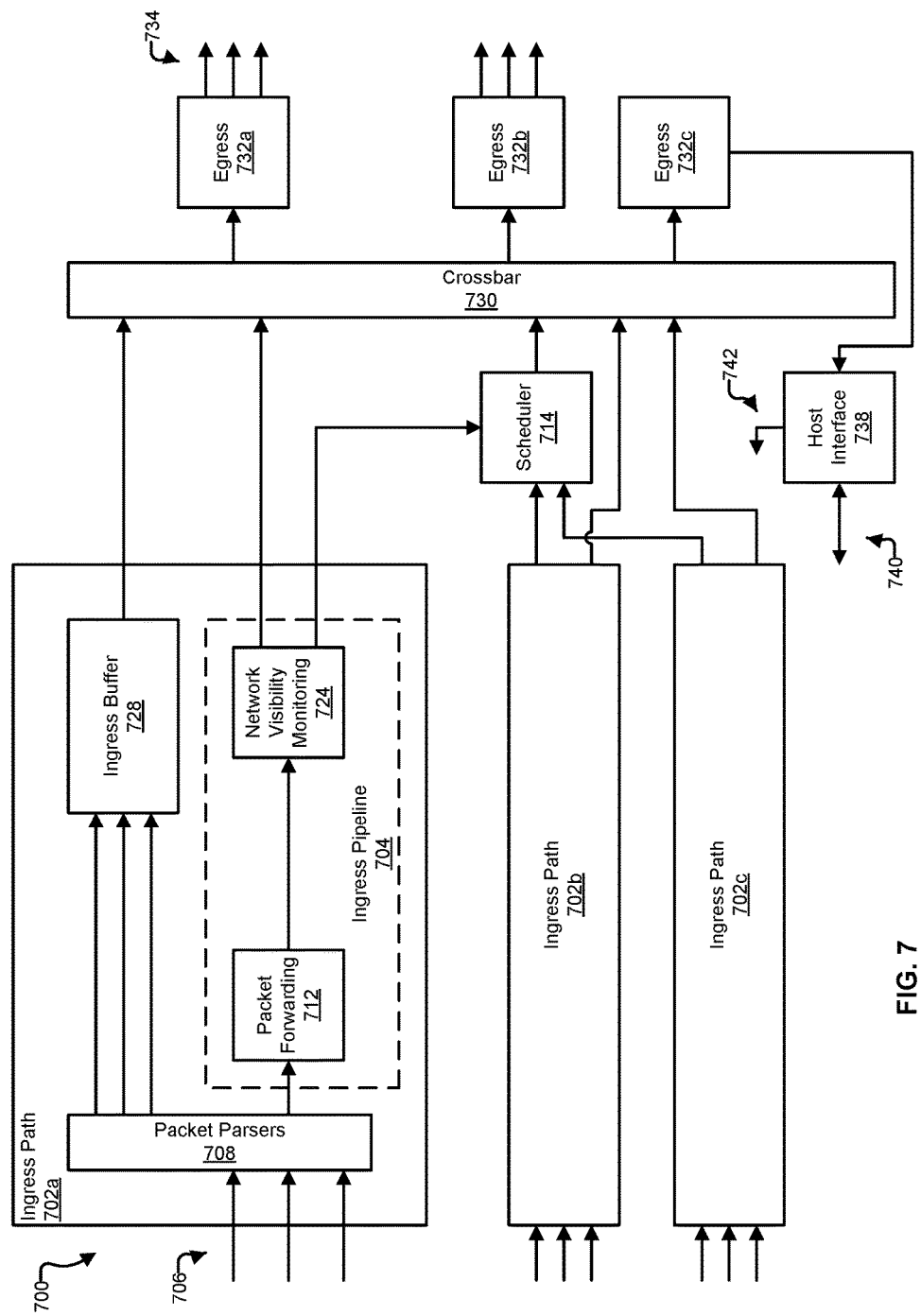
FIG. 7 illustrates an example of a switch circuit that may include one or more instances of a policer circuit.

FIG. 7 illustrates an example of a circuit 700 that may include one or more instances of a network visibility monitor 724. The circuit 700 in this example implements a switch. The circuit 700 may be implemented in all or part as an SOC, an ASIC, or an FPGA, or in a combination of devices. The illustrated switch circuit 700 may be used in switches and routers in a network. The network may provide a fabric connecting compute and storage servers in, for example, an enterprise network, a public network, a data center, and/or a cloud servicer provider, among others. The switch circuit 700 may be configured to route packets received over a number of ingress links 706 to a number of egress links 734. The switch circuit 700 may also be configured to drop certain packets. The switch circuit 700 may include one or more ingress paths 702a-c, a crossbar circuit 730, one or more egress paths 732a-c, and a host interface 738. The switch circuit 700 may include more or fewer modules than are illustrated here. Additionally, some or all of the illustrated modules may be combined into fewer modules, and/or may be divided into multiple sub-modules.

Each ingress path 702a-c may include a number of ingress links 706. For example, in some implementations, each ingress path 702a-c may include eight MAC units, and thus may support eight ingress links 706 to the network. Each ingress link 706 may include a physical interface that connects the circuit to the network. The switch circuit 700 may include multiple ingress paths 702a-c. For example, in one implementation, the circuit 700 includes sixteen instances of the ingress path 702a-c. In this implementation, the switch 700 may support up to 128 links, with eight links per ingress path 702a-c. An example of the internal modules of the ingress paths 702a-c is illustrated for the first ingress path 702a. It may be assumed that the internal workings of each ingress path 702a-c may be identical.

The links 706 for the first ingress path 702a may be connected to a number of parsers 708. The parsers 708 may process incoming packets and extract key fields, such as source and destination addresses, receiving and transmitting port numbers, a packet size, the size and type of the packet's headers, the packet's type or class, and/or any other information that may be found in a packet header. The parser 708 may place the extracted data into a block of data called metadata, which may also be referred to as packet information.

The parsers 708 may pass the data for the packets to an ingress buffer 728, and their accompanying packet information to an ingress pipeline 704. The ingress pipeline 704 may determine how and/or where a packet is to be routed, and/or whether a packet should be dropped The ingress pipeline 704 typically receives the packet information for a packet, while the packet itself moves to the ingress buffer 728. In most cases, the packet information occupies fewer bytes than the packet itself, and so the packet information functions as an easier-to-handle proxy for the packet. In various implementations, the ingress pipeline 704 includes packet forwarding logic 712 and a network visibility monitoring module 724. The packet information for a packet may be processed by each successive stage of the ingress pipeline 704, with each stage possibly modifying values, removing values, and/or adding values to the packet information.

The packet forwarding module 712 may determine how or where a packet should be routed. The packet forwarding module 712 may, for example, look up source and destination addresses in routing tables, examine port numbers, check values indicating the lifespan of the packet, and may modify the packet information for a packet to direct the packet to a specific egress link 734. In some cases, the packet forwarding module 712 may determine that a packet should be dropped, and may so indicate in the packet's packet information.

The network visibility monitoring module 724 may implement the circuits of FIGS. 1-5 and 6A-6C. In FIG. 7, the network visibility monitoring 724 module may gather information about packets flowing through the ingress pipeline 704. This information may be transmitted to a processor, in which case the information may be sent to the host interface 738. The processor may itself analyze the information, and/or may put the information into packets for transmission through a management link, or through one of the egress paths 732a-c, to a collector device on the network. Alternatively or additionally, the circuit 700 may generate packets for the information. The packets may be sent by way of the host interface 738 to the processor, and the processor may send the packets through a management link. Alternatively or additionally, the circuit 700 may send packets to the crossbar 730 for transmitting out of an egress path 732a-c. The information sent to the processor or collector device may include an estimate of the number of unique flows seen by the circuit 700, information about flows identified as large flows, and/or samples of packets identified as associated with small flows. In some implementations, the network visibility monitoring 724 module may have access to the actual packet data, and may be configured to take samples from packets designated for sampling. In other implementations, the network visibility monitoring 724 module may designate a packet for sampling, and the sample may be taken by, for example, at the ingress buffer 728.

The network visibility monitoring module 724 may also send packet information to the scheduler 714. In some implementations, the network visibility monitoring module 724 may examine packet information and pass it on to the scheduler 714 without modifying the packet information. In some implementations, the network visibility monitoring module 724 may set a value in packet information for packets that are to be sampled.

In some implementations, packets may be sampled by the ingress paths 702a-c. In these implementations, the samples may be based on the packet's contents when the packet was received by the switch circuit 700. In some implementations, the packets may be sampled by the egress paths 732a-b. In these implementations, the samples may be based on the packet's contents as the packet exits the switch circuit 700.

The scheduler 714 may receive the packet information from each of the ingress paths 702a-c. The scheduler 714 may manage transmission of packets across the crossbar 730. The scheduler 714 may, for example, direct the crossbar 730 to receive packet data for a packet from the ingress buffer 728, and control which egress path 731a-c a packet goes to using the packet information for the packet. The scheduler 714 may also direct the crossbar 730 to drop certain packets. For example, when the drop status in the packet information for a packet indicates that a packet is to be dropped, then the scheduler 714 may direct the crossbar 730 to not forward the packet to an egress path 732a-c. Packets forwarded to the egress paths 732a-c may subsequently be directed to an appropriate egress link 734.

Packets that are marked to be forwarded to a processor may be directed by the crossbar 730 to an egress path 732c designated for packets being sent to a processor. The designated egress path 732c may send packets to a host interface 738 module. The host interface 738 module may manage communication with one or more processors or processor cores. The processor or processors may be in the same circuit that includes the switch circuit 700, may be in the same package, may reside on the same board, and/or may be in the same chassis. The host interface 738 may receive read and write requests from a processor over an interface 740 to the processor. The host interface 738 may also have an interface 742 that connects to some or all of the modules in the switch circuit 700. This interface 742 provides a processor access to the modules, which the processor may use to configure the modules and/or to read information from the modules. Packets directed to a processor may also be sent to the processor using the host interface's 738 interface 740 to the processor.

VI. Methods

FIGS. 8-11 illustrate examples processes for various aspects of network visibility monitoring, including large flow identification, sampling based on large flow identification, and identification of historically large flows. These processes may be implemented by the systems described above, such as for the circuits and processes illustrated in FIGS. 1, 3-5, 6A-6C, and 7. The steps for each example process are illustrated for ease of understanding, and the individual steps may be executed in an order other than the order given, may include additional steps, and/or may be combined into fewer steps.

Figure 8:
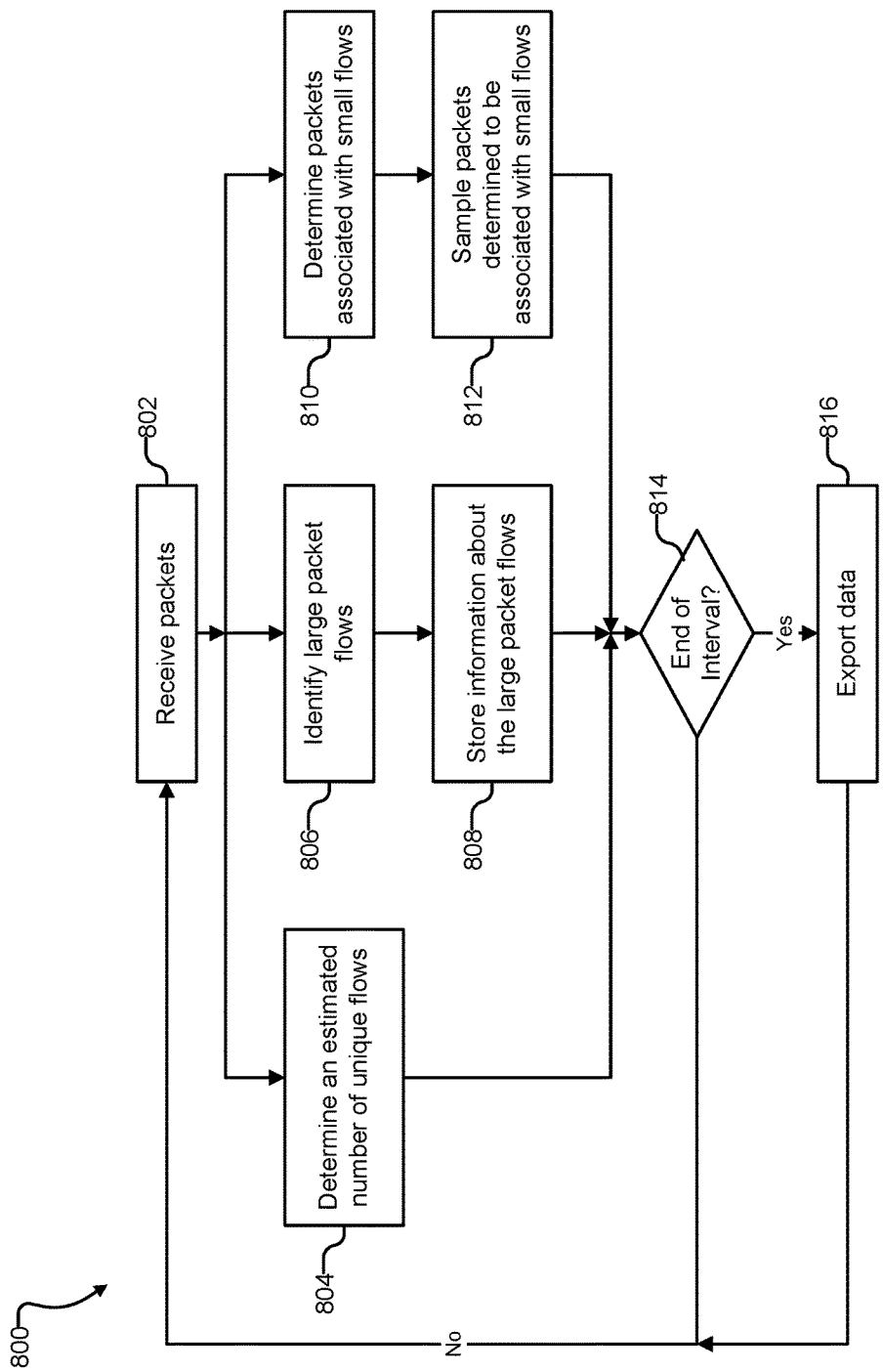
FIG. 8 illustrates an example of a process for network visibility monitoring.

FIG. 8 illustrates an example of a process 800 for network visibility monitoring. The process 800 may be implemented by an integrated circuit included in a network device. The process may provide data for measuring packet flows seen at the network device over an interval of time.

At step 802, the circuit that is implementing the process 800 may receive packets. Each packet may be processed in several different ways at the same time, to produce different measurement data. First, at step 804, the packet may be used to determine an estimated number of unique flows. To estimate the number of unique flows, the circuit may use information identifying the flow that the packet is associated with to generate a hash value. The hash value may be used as an approximate count of all the flows seen.

Second, at steps 806 and 808, the packet may be used to cache information about large packet flows. At step 806, information identifying the flow with which a packet is associated may be used to identify the packet as belonging to a large flow. The packet may belong to a large flow if a counter used to track the bytes in a flow is at or over a threshold. At step 808, the circuit may store information about packet flows identified as large. For example, the circuit may store the identification information and statistics about the flow. The circuit may also store some state information for each large flow, such as error indicators and/or a lock indicator.

Third, at steps 810 and 812, the packet may be selected for sampling. At step 810, the circuit may determine that a packet is associated with a small flow. At step 812, the packet may be sampled. Sampling a packet may include copying a number of bytes from the start of the packet. In most implementations, not all packets associated with small flows will be sampled. In these implementations, the circuit may include a counter that is incremented for each packet that belongs to a small flow. The circuit may also include a pre-determined limit, and when the counter reaches the limit, the packet that caused the counter to reach the limit will be sampled. The counter may thus be used to select one out of so many packets (e.g., one out of 128) to be sampled.

At step 814, the process 800 may determine whether the end of the current data collection interval has been reached. During the data collection interval, the circuit implementing the process 800 may receive and process packets. At the end of the interval of time, the process 800 may proceed to step 816, where the collected data is exported. Exporting the data may include collecting the data for the estimated number of unique flows, the information stored for large flows, and the samples from the packets from small flows, and analyzing the data. The data may be analyzed using a processor that is in the same package, on the same board, or in the same chassis as the circuit that is implementing the process 800. Alternatively or additionally, exporting the data may include generating packets that contain the data, where the packets are addressed to a collector device on the network. The packets may be transmitted over the network to the collector device.

Once the data is exported, the process 800 may start a new data collection interval. In some implementations, before the interval starts, the process 800 may clear the data from the previous cycle, including the data for the estimated number of unique flows, the information stored for large flows, and the packet samples.

Figure 9:
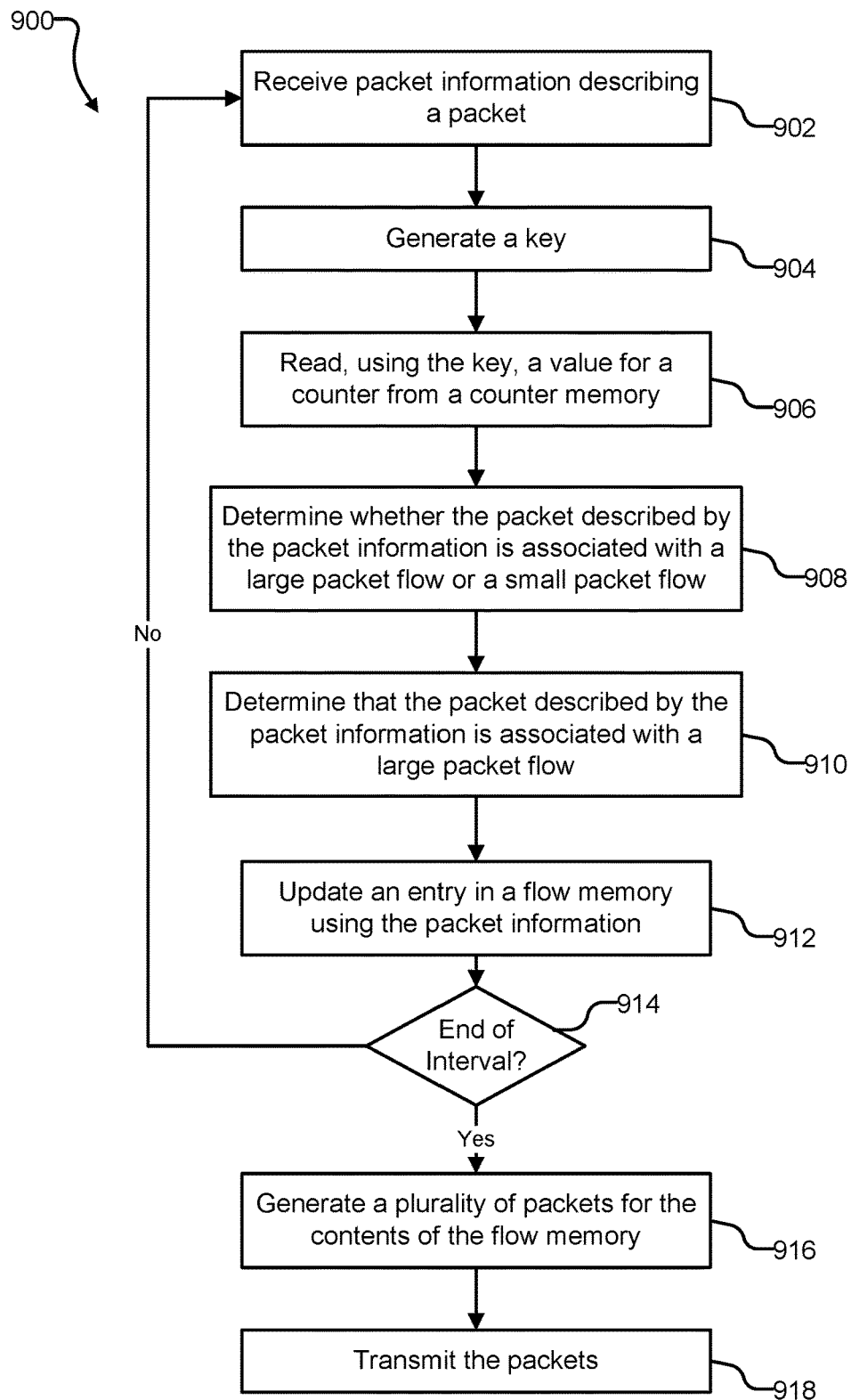
FIG. 9 illustrates an example of a process for identifying large packet flows.

FIG. 9 illustrates an example of a process 900 for identifying large packet flows. The process 900 may be executed using an integrated circuit for network visibility monitoring, which may be included in a network device. The process may provide information about large packet flows, where packets for the large packet flows were seen during an interval of time.

At step 902, the circuit that is implementing the process 900 may receive packet information describing a packet. The information describing the packet may include, for example, source and destination information, protocol and/or class information, a size of the packet, and/or other information that may be provided by a packet header.

At step 904, the circuit may generate a key. The key may be generated using flow identification information provided by the packet information. The key may be generated, for example, using hash logic. In various implementations, the circuit may generate more than one key (e.g., three keys). In these implementations, the circuit may include multiple, different hash logic modules to produce each key.

At step 906, the circuit may use the key generated at step 904 to read a value for a counter from a counter memory. The counter memory may be configured to store many counters. In various implementations, the circuit may use multiple keys to read a counter for each key from the counter memory.

At step 908, the circuit may determine whether the packet described by the packet information is associated with a large packet flow or a small packet flow. The circuit may make this determination by checking the value of the counter. When the counter is at or over a threshold value when read from the counter memory, then the packet is likely associated with a large flow. Furthermore, the counter value being over the threshold indicates that this flow was previously identified as large. When the counter is below the threshold when read from the counter memory, but is at or above the threshold when the size of the packet is added to the counter, then the packet is associated with large flow. In this case, because the size of the packet put the counter at or over the threshold, the associated flow is likely a newly-identified large flow. At step 910, the circuit may determine that the packet described by the packet information is likely associated with a large packet flow.

Having identified a large flow, the circuit, at step 912, may update an entry in a flow memory using the packet information. The entry in the flow memory may be read using the key generated at step 904. In some cases, the key cannot be found because the circuit has identified a new large flow, and no information has yet been stored for this flow. In these cases, the circuit may add they signature to the flow memory, and may initialize the corresponding entry in the flow memory. Initializing the entry may include storing identification information for the newly-identified large flow. Initializing the entry may also include initializing state information for the flow. In other cases, the large flow was previously identified, and the circuit is able to find the key in the flow memory. In these cases, updating the entry in the flow memory may include, for example, updating packet counters, a sum of the packet sizes for the packets in the flow, and/or updating other information about the flow.

At step 914, the circuit may determine whether the end of the data collection interval has been reached. During this interval, the circuit may continue to receive packet information for additional packets, identify packets associated with large flows, and store information about the identified large flows.

At the end of the interval, the process 900 may proceed to step 916. At step 916, the circuit may generate a plurality of packets for the contents of the flow memory. The contents of the flow memory may be read and put into the packets, and each packet may be addressed to a collector device on the network. At step 918 the packets may be transmitted onto the network.

Figure 10:
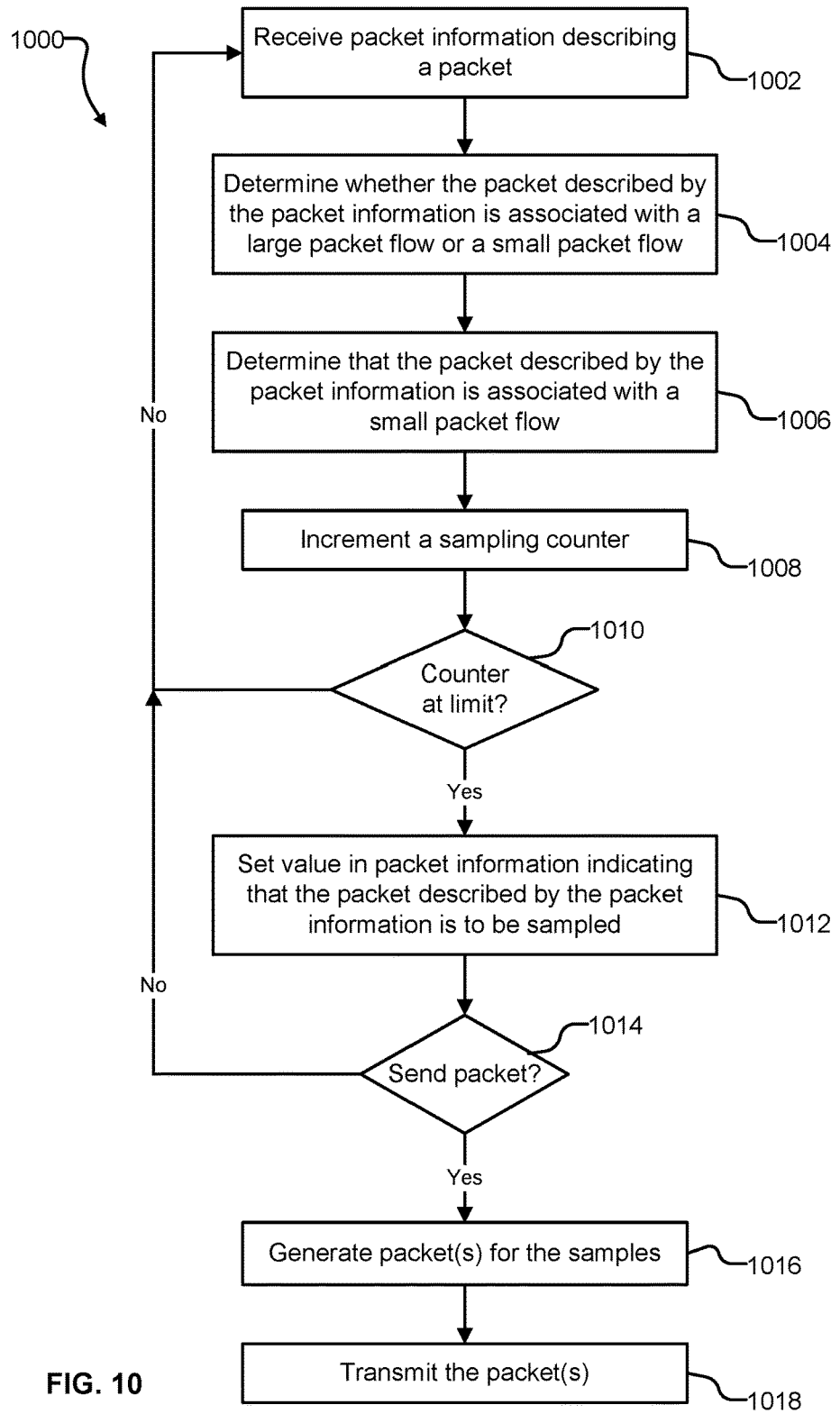
FIG. 10 illustrates an example of a process for sampling packets based on identifying large flows.

FIG. 10 illustrates an example of a process 1000 for sampling packets, based on identifying large flows. The process 1000 may be executed using an integrated circuit included in a circuit for network visibility monitoring, which may be included in a network device. The process 1000 may provide information about packets from small flows.

At step 1002, the circuit implementing the process 1000 may receive packet information describing a packet. The information describing the packet may include, for example, source and destination information, protocol and/or class information, a size of the packet, and/or other information that may be provided by a packet header.

At step 1004, the circuit may determine whether the packet described by the packet information is associated with a large packet flow or a small packet flow. The circuit may make this determination by checking the value of a counter. When the counter is below a threshold value even after adding the size of the packet to the counter, then the packet is associated with a small flow. The circuit may determine, at step 1006, that the packet described by the packet information is associated with a small flow.

Having determined that the packet described by the packet information is associated with a small flow, the circuit, at step 1008, may increment a sampling counter. The sampling counter may be incremented for each packet that is identified as associated with a small flow. In some implementations, the circuit may be configured to sample packets from some large flows also. In these implementations, the sampling counter may also be incremented for some packets determined to be associated with large flows. Alternatively or additionally, there may be a separate sampling counter for packets from large flows.

At step 1010, the circuit may check whether the sampling counter has reached a limit. The limit may be configurable; for example, it may be set to between 128 and 8192. When the counter has not yet reached the limit, the circuit will continue to receive packet information, identify packets that are associated with small flows, and increment the sampling counter.

When the sampling counter has reached the limit, the circuit may, at step 1012, set a value in the packet information indicating that the packet described by the packet information is to be sampled. Sampling may include copying a number of bytes (e.g., 128 bytes) from the beginning of the packet. The packet may be sampled by the circuit that is implementing the process 1000, and/or the packet may be sampled by another circuit that is coupled to the circuit that is implementing the process 1000.

At step 1014, the circuit may determine whether to send a packet. The circuit may send a packet when enough samples have been collected to fill a packet. Alternatively or additionally, in some implementations, the circuit may send a packet after a pre-determined interval of time has passed. In these implementations, the circuit may send a packet whether or not enough samples have been collected to fill a packet. Alternatively or additionally, the circuit may have enough samples for multiple packets.

At step 1016, the circuit may generate a packet or packets for the collected samples. Each packet may be addressed to a collector device on the network. At step 1018, the packet or packets may be transmitted onto the network.

Figure 11:
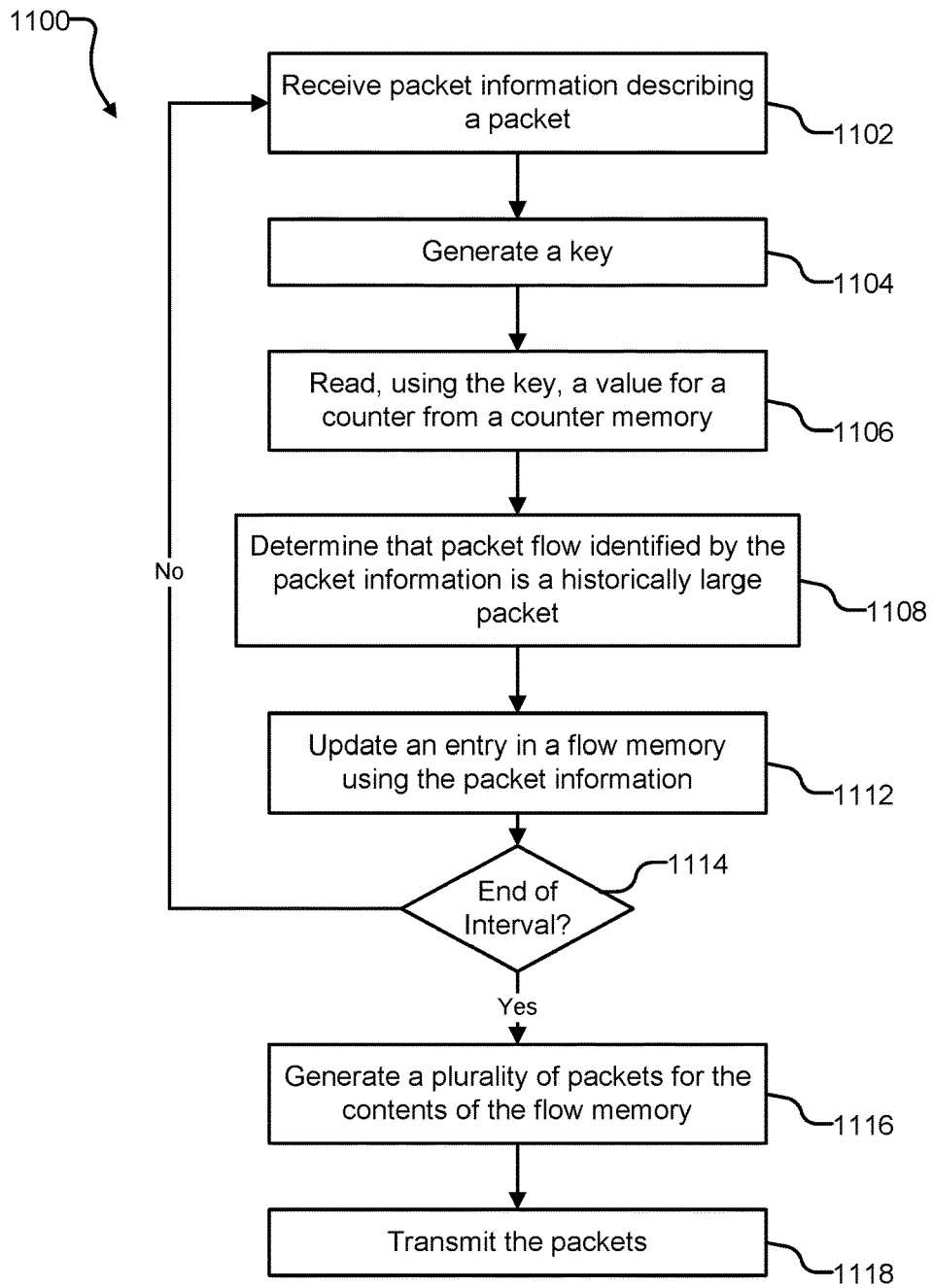
FIG. 11 illustrates an example of a process for identifying historically large flows.

FIG. 11 illustrates an example of a process 1100 for identifying and managing historically large flows. The process 1100 may be executing using an integrated circuit for network visibility monitoring, which may be included in a network device. The process 1100 may provide even more accurate information about large packet flows.

At step 1102, the circuit implementing the process 1100 may receive packet information describing a packet. The information describing the packet may include, for example, source and destination information, protocol and/or class information, a size of the packet, and/or other information that may be provided by a packet header.

At step 1104, the circuit may generate a key. The key may be generated using flow identification information provided by the packet information. The key may be generated, for example, using hash logic. In various implementations, the circuit may generate more than one key (e.g., three keys). In these implementations, the circuit may include multiple, different hash logic modules to produce each key.

At step 1106, the circuit may use the key generated at step 1104 to read a value for a counter from a counter memory. The counter memory may be configured to store many counters. In various implementations, the circuit may use multiple keys to read a counter for each key from the counter memory.

At step 1108, the circuit may determine that a packet flow identified by the packet information is a historically large packet flow. The process 1100 may make this determination using state information stored with each counter. This state information may have been read from the counter memory at step 1106. The state information may indicate whether the associated counter was used to determine that a packet flow was a newly-identified large packet flow in a previous data collection interval. The state information may provide the history for the counter for one or more data collection intervals.

At step 1112, the circuit may update an entry in the flow memory using the packet information. Updating the entry in the flow memory may include, for example, storing a signature for the flow identified by the packet information, and/or replacing the data in the entry when the entry is not locked or the flow identified by the packet information is a newly-identified large flow.

At step 1114, the circuit may determine whether the end of the data collection interval has been reached. During this interval, the circuit may continue to receive packet information for additional packets, identify packets associated with historically large flows, and store information about the identified large flows.

At the end of the interval, the process 1100 may proceed to step 1116. At step 1116, the circuit may generate a plurality of packets for the contents of the flow memory. The contents of the flow memory may be read and put into the packets, and each packet may be addressed to a collector device on the network. At step 1118 the packets may be transmitted onto the network.

VII. Computing Systems

Figure 12:
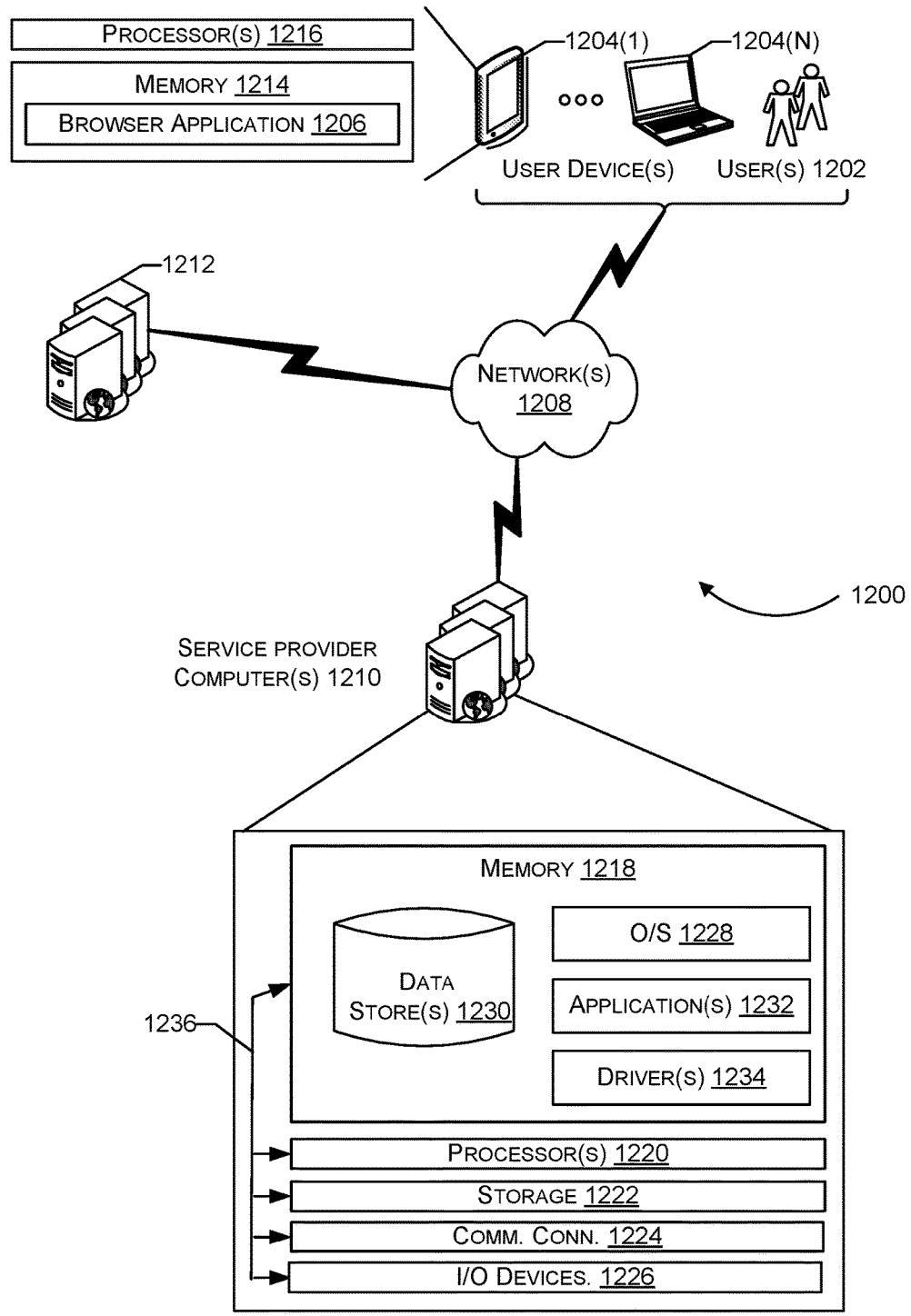
FIG. 12 illustrates an example architecture for features and systems described herein that includes one or more service provider computers and/or a user device connected via one or more networks, according to some embodiments.

FIG. 12 illustrates an example architecture 1200 for features and systems described herein. The example architecture 1200 includes one or more service provider computers 1210 and/or user devices 1204 connected via one or more networks 1208. The circuits discussed with respect to FIGS. 1-5, 6A-6C, and 7 may use one or more components of the computing devices described in FIG. 12, or may represent one or more computing devices described in FIG. 12, or may be included in one or more of the computing devices described.

In the illustrated architecture 1200, one or more users 1202 may use user computing devices 1204(1)-(N) to access an application 1206 (e.g., a web browser or mobile device application), via one or more networks 1208. In some aspects, the application 1206 may be hosted, managed, and/or provided by a computing resources service or service provider. One or more service provider computers 1210 may provide a native application that is configured to run on the user devices 1204, which user(s) 1202 may interact with. The service provider computer(s) 1210 may, in some examples, provide computing resources such as, but not limited to, client entities, low latency data storage, durable data storage, data access, management, virtualization, cloud-based software solutions, electronic content performance management, and so on. The service provider computer(s) 1210 may also be operable to provide web hosting, data-basing, computer application development and/or implementation platforms, combinations of the foregoing or the like to the user(s) 1202. The service provider computer(s) 1220, in some examples, may communicate with one or more third party computers 1212.

In some examples, network(s) 1208 may include any one or a combination of many different types of networks, such as cable networks, the Internet, wireless networks, cellular networks and other private and/or public networks. While the illustrated example represents the user(s) 1202 accessing an application 1206 over the network(s) 1208, the described techniques may equally apply in instances where the user(s) 1202 interact with the service provider computer(s) 1220 via user device(s) 1204 over a landline phone, via a kiosk or in some other manner. The described techniques may also apply in other client/server arrangements (e.g., set-top boxes, etc.), as well as in non-client/server arrangements (e.g., locally stored applications, etc.).

As described above, the application 1206 may allow the user(s) 1202 to interact with the service provider computer(s) 1210 to, for example, access web content (e.g., web pages, music, video, etc.). The service provider computer(s) 1210, which may be arranged in a cluster of servers or as a server farm, may host the application 1206 and/or cloud-based software services. Other server architectures may also be used to host the application 1206. The application 1206 may be capable of handling requests from many users 1202 and serving, in response, various item web pages, for example. The application 1206 can provide any type of website that supports user interaction, including social networking sites, online retailers, informational sites, blog sites, search engine sites, news and entertainment sites, and so forth. As discussed above, the described techniques can similarly be implemented outside of the application 1206, such as with other applications running on the user device(s) 1204.

The user device(s) 1204 may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) 1204 may be in communication with the service provider computer(s) 1210 via the network(s) 1208, or via other network connections. Additionally, the user device(s) 1204 may be part of the distributed system managed by, controlled by, or otherwise part of the service provider computer(s) 1220 (e.g., a console device integrated with the service provider computers 1210).

In one example configuration, a user device(s) 1204 may include at least one memory 1214 and one or more processing units (or processor(s) 1216). The processor(s) 1216 may be implemented in hardware, computer-executable instructions, firmware, or combinations thereof. Computer-executable instruction or firmware implementations of the processor(s) 1216 may include computer-executable or machine-executable instructions written in any suitable programming language to perform the various functions described. The user device(s) 1204 may also include geo-location devices (e.g., a global positioning system (GPS) device or the like) for providing and/or recording geographic location information associated with the user device(s) 1204.

The user device memory 1214 may store program instructions that are loadable and executable on the user device processor(s) 1216, as well as data generated during the execution of these programs. Depending on the configuration and type of the user device(s) 1204, the user device memory 1214 may be volatile (such as random access memory (RAM)) and/or non-volatile (such as read-only memory (ROM), flash memory, etc.). The user device(s) 1204 may also include additional removable storage and/or non-removable storage including, but not limited to, magnetic storage, optical disks, solid state disks, flash memory, and/or tape storage. The storage devices and their associated computer-readable media may provide non-volatile storage of computer-readable instructions, data structures, program modules, and other data for the computing devices. In some implementations, the memory 1214 may include multiple different types of memory, such as static random access memory (SRAM), dynamic random access memory (DRAM), or ROM.

Turning to the contents of the user device memory 1214 in more detail, the memory 1214 may include an operating system and one or more application programs or services for implementing the features disclosed herein. The one or more application programs or services may include at least a user provided input element or electronic service web page, such as a browser application 1206 or dedicated applications (e.g., smart phone applications, tablet applications, etc.). The browser application 1206 may be configured to receive, store and/or display a website or other interface for interacting with the service provider computer(s) 1210. Additionally, the memory 1214 may store access credentials and/or other user information such as for example, user IDs, passwords and/or other user information. In some examples, the user information may include information for authenticating an account access request. Such information includes, for example, a device ID, a cookie, an IP address, a location, or the like. In addition, the user information may include a user-provided response to a security question or a geographic location obtained by the user device 1204.

In some aspects, the service provider computer(s) 1210 may include computing devices such as for example a mobile phone, a smart phone, a personal digital assistant (PDA), a laptop computer, a desktop computer, a netbook computer, a server computer, a thin-client device, a tablet computer, a gaming console, etc. Additionally or alternatively, in some embodiments, the service provider computer(s) 1210 may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. In some examples, the service provider computer(s) 1210 may be in communication with the user device(s) 1204 and/or other service providers via the network(s) 1208, or via other network connections. The service provider computer(s) 1210 may include one or more servers, perhaps arranged in a cluster, as a server farm, or as individual servers not associated with one another. These servers may be configured as part of an integrated, distributed computing environment.

In one example configuration, the service provider computer(s) 1210 may include at least one memory 1218 and one or more processing units (or processor(s) 1220). The processor(s) 1220 may be implemented in hardware, computer-executable instructions, firmware, or combinations thereof. Computer-executable instruction or firmware implementations of the processor(s) 1220 may include computer-executable or machine-executable instructions written in any suitable programming language to perform the various functions described.

In some instances, the hardware processor(s) 1220 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or execution threads). In such a core (e.g., those with multiple logical processors), several stages of the execution pipeline and also lower level caches may also be shared.

The memory 1218 may store program instructions that are loadable and executable on the processor(s) 1220, as well as data generated during the execution of these programs. Depending on the configuration and type of the service provider computer(s) 1210, the memory 1218 may be volatile (such as RAM) and/or non-volatile (such as ROM, flash memory, etc.). The memory 1218 may include an operating system 1228, one or more data stores 1230, one or more application programs 1232, one or more drivers 1234, and/or services for implementing the features disclosed herein.

The operating system 1228 may support a service provider computer's 1210 basic functions, such as scheduling tasks, executing applications, and/or controller peripheral devices. In some implementations, a service provider computer 1210 may host one or more virtual machines. In these implementations, each virtual machine may be configured to execute its own operating system. Examples of operating systems include Unix, Linux, Windows, Mac OS, iOS, Android, and the like. The operating system 1228 may also be a proprietary operating system.

The data stores 1230 may include permanent or transitory data used and/or operated on by the operating system 1228, application programs 1232, or drivers 1234. Examples of such data include web pages, video data, audio data, images, user data, and so on. The information in the data stores 1230 may, in some implementations, be provided over the network(s) 1208 to user devices 1204. In some cases, the data stores 1230 may additionally or alternatively include stored application programs and/or drivers. Alternatively or additionally, the data stores 1230 may store standard and/or proprietary software libraries, and/or standard and/or proprietary application user interface (API) libraries. Information stored in the data stores 1230 may be machine-readable object code, source code, interpreted code, or intermediate code.

The application programs 1232 include programs may include programs accessible to user devices 1204 over the network(s) 1208. Examples of such programs include word processing programs, accounting programs, media players, image editing programs, games, and so on. The application programs 1232 may alternatively or additionally include programs executing in a clustering or distributed environment, that is, applications executing cooperatively between multiple server provider computers 1210.

The drivers 1234 include programs that may provide communication between components in a server provider computer 1210. For example, some drivers 1234 may provide communication between the operating system 1228 and additional storage 1222, communication connections 1224, and/or I/O device 1226. Alternatively or additional, some drivers 1234 may provide communication between application programs 1232 and the operating system 1228, and/or application programs 1232 and peripheral devices accessible to the service provider computer 1210. In many cases, the drivers 1234 may include drivers that provide well-understood functionality (e.g., printer drivers, display drivers, hard disk drivers). In other cases, the drivers 1234 may proprietary or specialized functionality.

The service provider computer(s) 1210 or servers may also include additional storage 1222, which may include removable storage and/or non-removable storage. The additional storage 1222 may include magnetic storage, optical disks, solid state disks, flash memory, and/or tape storage. The additional storage 1222 may be housed in the same chassis as the service provider computer(s) 1210 or may be in an external enclosure. The memory 1218 and/or additional storage 1222 and their associated computer-readable media may provide non-volatile storage of computer-readable instructions, data structures, program modules, and other data for the computing devices. In some implementations, the memory 1218 may include multiple different types of memory, such as SRAM, DRAM, or ROM.

The memory 1218, the additional storage 1222, both removable and non-removable, are examples of computer-readable storage media. For example, computer-readable storage media may include volatile or non-volatile, removable or non-removable media implemented in a method or technology for storage of information, the information including for example computer-readable instructions, data structures, program modules, or other data. The memory 1218 and the additional storage 1222 are examples of computer storage media. Additional types of computer storage media that may be present in the service provider computer(s) 1210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the service provider computer(s) 1210. Computer-readable media also includes combinations of any of the above media types.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The service provider computer(s) 1210 may also contain communications connection(s) 1224 that allow the service provider computer(s) 1210 to communicate with a stored database, another computing device or server, user terminals and/or other devices on the network(s) 1208. The service provider computer(s) 1210 may also include I/O device(s) 1226, such as a keyboard, a mouse, a pen, a voice input device, a touch input device, a display, speakers, a printer, and the like. The communication connection(s) 1224 and I/O device(s) 1226, along with the storage 1222, may be described as peripheral devices.

The service provider computer(s) 1210 may also include one or more communication channels 1236. A communication channel 1236 may provide a medium over which the various components of the service provider computer 1210 can communicate. The communication channel or channels 1236 may take the form of a bus, a ring, a switching fabric, or a network.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 12, and/or functions described herein can be provided by one or more modules that exist as separate modules and/or module functions described herein can be spread over multiple modules.

Figure 13:
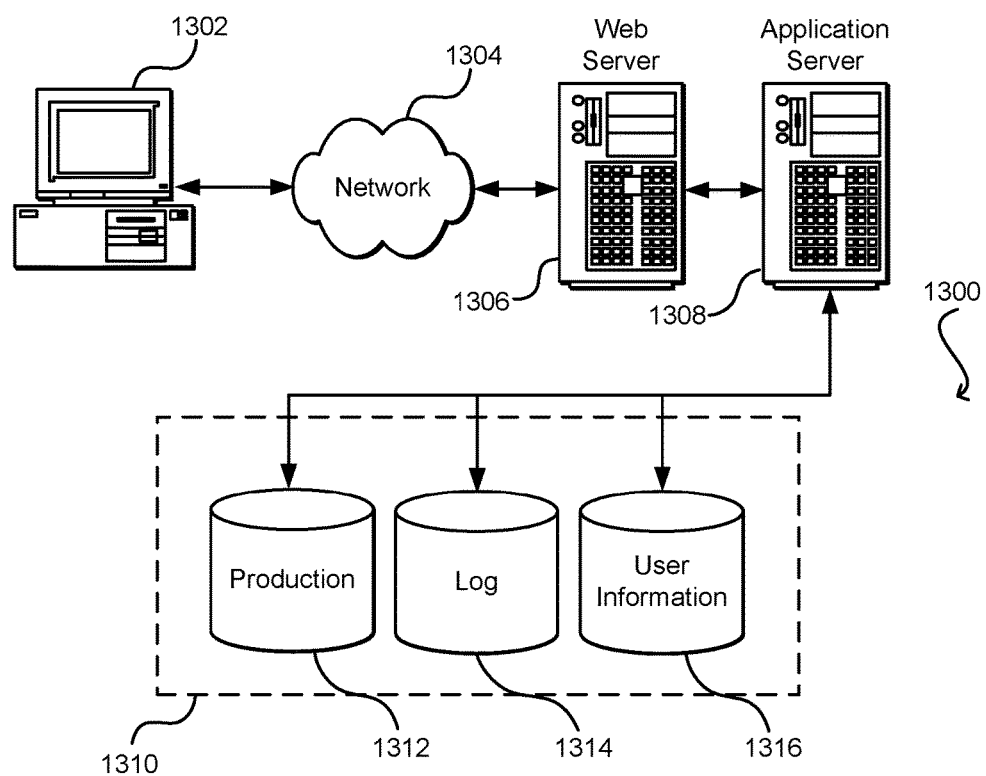
FIG. 13 illustrates aspects of an example environment of a computing system for implementing aspects in accordance with some embodiments.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include an appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1302 and the application server 1308, can be handled by the Web server 1306. It should be understood that the Web 1306 and application servers 1308 are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store 1310 illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store 1310, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store 1310 might access the user information 1316 to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server 1306, 1308 typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment 1300 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit, comprising:
   a clock input;
   a large-flow detection logic including a counter memory; and
   a sampling determination logic including a sampling counter;
   wherein the integrated circuit is operable to:
      receive, at a cycle of the clock input, a first packet information describing a first packet, wherein the first packet is associated with a first packet flow being transmitted through a network;
      determine, using the large-flow detection logic, a key, wherein determining the key includes using information identifying a packet flow provided by the first packet information, wherein the key is determined using a hash function;
      simultaneously read, using the key, a plurality of values for a plurality of counters from the counter memory;
      determine, using the large-flow detection logic, whether the first packet described by the first packet information is associated with a large packet flow or a small packet flow, wherein the first packet is associated with a small packet flow when a value for at least one counter from the plurality of counters is less than a threshold;
      upon determining that the first packet described by the first packet information is associated with a small packet flow, incrementing the sampling counter, wherein, when the sampling counter reaches a pre-determined limit, a particular packet received when the sampling counter reached the pre-determined limit is sampled, wherein sampling includes copying a set of bytes from the particular packet;

receive second packet information describing a second packet, wherein the second packet is associated with a second packet flow being transmitted through the network;

determine, using the large-flow detection logic, that the second packet described by the second packet information is associated with a large packet flow;

determine, from a configuration setting, whether packets from large packet flows are to be sampled; and update the sampling determination logic according to the configuration setting.

2. The integrated circuit of claim 1, wherein the integrated circuit is further operable to, upon determining that the sampling counter has reached the pre-determined limit, set a value in the first packet information, the value indicating that the first packet described by the first packet information is to be sampled.

3. The integrated circuit of claim 1, wherein the key is determined by providing the information identifying the packet flow to the hash function, wherein the large-flow detection logic includes the hash function.

4. The integrated circuit of claim 1, wherein the integrated circuit is operable to determine that the first packet described by the first packet information is associated with a small packet flow by determining that the at least one counter is below the threshold after the at least one counter is incremented based on a size of the first packet.

5. The integrated circuit of claim 1, wherein the integrated circuit is further operable to:

determine, using the large-flow detection logic, an additional key using the information identifying the packet flow, wherein the plurality of values are further simultaneously read using the additional key.

6. An integrated circuit, comprising:
a clock input;
a large-flow detection logic; and
a sampling determination logic;
wherein the integrated circuit is operable to:
receive, at a cycle of the clock input, first packet information describing a first packet, wherein the first packet is associated with a first packet flow being transmitted through a network;
determine, using the large-flow detection logic, a key associated with the first packet, wherein the key is determined using a hash function;
determine whether the first packet is associated with a large packet flow or a small packet flow, wherein the large-flow detection logic simultaneously uses a plurality of counters associated with the key to determine whether the first packet is associated with a large packet flow or a small packet flow, and wherein the first packet is associated with a small packet flow when at least one counter from the plurality of counters is less than a threshold;
upon determining that the first packet is associated with a small packet flow, update the sampling determination logic, wherein the sampling determination logic determines whether the first packet is to be sampled, and wherein sampling includes copying a set of bytes from the first packet;

receive second packet information describing a second packet, wherein the second packet is associated with a second packet flow being transmitted through the network;

determine, using the large-flow detection logic, that the second packet is associated with a large packet flow;

determine, from a configuration setting, whether packets from large packet flows are to be sampled; and update the sampling determination logic according to the configuration setting.

7. The integrated circuit of claim 6, wherein the sampling determination logic includes a sampling counter, and wherein integrated circuit is further operable to, upon determining that the sampling counter has reached a pre-determined limit, set a value in the first packet information, the value indicating that the first packet is to be sampled.

8. The integrated circuit of claim 7, wherein the pre-determined limit is configurable.

9. The integrated circuit of claim 6, wherein the integrated circuit is further operable to:

determine, from the configuration setting, that packets from large packet flows are to be sampled.

10. The integrated circuit of claim 9, wherein the sampling determination logic includes a sampling counter, and wherein the integrated circuit is further operable to, upon determining that the sampling counter has reached a second pre-determined limit:

set a value in the second packet information, the value indicating that the second packet is to be sampled, wherein a first pre-determined limit is associated with small packet flows and the second pre-determined limit is associated with large packet flows.

11. The integrated circuit of claim 10, wherein the second pre-determined limit is different than the first pre-determined limit.

12. The integrated circuit of claim 6, wherein the integrated circuit is operable to determine that the first packet is associated with a small packet flow by determining that the at least one counter is below a threshold when the at least one counter is incremented based on a size of the first packet, wherein the size of the first packet is provided by the first packet information.

13. The integrated circuit of claim 6, wherein the integrated circuit is operable to receive packet information at each cycle of the clock input.

14. A method, comprising:
receiving, at an integrated circuit, first packet information describing a first packet, wherein the first packet is associated with a first packet flow being transmitted over a network;
determining a key associated with the first packet, wherein the key is determined using a hash function;
determining whether the first packet is associated with a large packet flow or a small packet flow, wherein the integrated circuit simultaneously uses a plurality of counters associated with the key to determine whether the first packet is associated with a large packet flow or a small packet flow, and wherein the first packet is associated with a small packet flow when at least one counter from the plurality of counters is below a threshold;
upon determining that the first packet is associated with a small packet flow, updating a sampling determination logic, wherein the sampling determination logic determines whether the first packet is to be sampled, and wherein sampling includes copying a set of bytes from the first packet;

receiving second packet information describing a second packet, wherein the second packet is associated with a second packet flow being transmitted through the network;

determining that the second packet is associated with a large packet flow;

determining, from a configuration setting, whether packets from large packet flows are to be sampled; and updating the sampling determination logic according to the configuration setting.

15. The method of claim 14, wherein the sampling determination logic includes a sampling counter, and further comprising, upon determining that the sampling counter has reached a pre-determined limit, setting a value in the first packet information, the value indicating that the first packet is to be sampled.

16. The method of claim 15, wherein the pre-determined limit is configurable.

17. The method of claim 14, further comprising, upon determining that a pre-determined number of samples have been taken:

generating a third packet including the samples, wherein the third packet is addressed to a collector device on the network; and transmitting the third packet.

18. The method of claim 14, further comprising:

at an end of a pre-determined interval, generating a third packet including samples from one or more packets, wherein the third packet is addressed to a collector device on the network; and transmitting the third packet.

19. The method of claim 18, wherein the third packet further includes a timestamp for each of the samples from the one or more packets, the timestamp indicating when a sample was taken.

20. The method of claim 14, wherein the set of bytes are copied from a beginning of the first packet.

21. The method of claim 14, wherein a small packet flow uses a small percentage of overall available network bandwidth.

22. The method of claim 14, further comprising:

determining to sample packets associated with large packet flows based on the integrated circuit being unable to record information for the large packet flows.

* * * * *